US011567032B2

(12) United States Patent
Watanabe et al.

(10) Patent No.: US 11,567,032 B2
(45) Date of Patent: Jan. 31, 2023

(54) CERAMIC HEATER, SENSOR ELEMENT, AND GAS SENSOR

(71) Applicant: NGK INSULATORS, LTD., Nagoya (JP)

(72) Inventors: Yusuke Watanabe, Nagoya (JP); Takao Murase, Konan (JP); Masashi Yasui, Nagoya (JP); Rui Sakaguchi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 442 days.

(21) Appl. No.: 16/879,163

(22) Filed: May 20, 2020

(65) Prior Publication Data

US 2020/0284752 A1 Sep. 10, 2020

Related U.S. Application Data

(62) Division of application No. 15/238,817, filed on Aug. 17, 2016, now Pat. No. 10,712,307.

(30) Foreign Application Priority Data

Aug. 21, 2015 (JP) .............................. JP2015-164213
Jan. 29, 2016 (JP) .............................. JP2016-015632

(51) Int. Cl.
*G01N 27/40* (2006.01)
*H05B 1/02* (2006.01)
(Continued)

(52) U.S. Cl.
CPC ....... *G01N 27/4067* (2013.01); *H05B 1/0247* (2013.01); *H05B 3/265* (2013.01)

(58) Field of Classification Search
CPC ............ G01N 27/4067; F02D 41/1494; F01N 2560/20; H05B 1/0247; H05B 3/0265;
(Continued)

(56) References Cited

U.S. PATENT DOCUMENTS 3,778,744 A 12/1973 Brandi
3,875,477 A 4/1975 Fredriksson et al.
(Continued)

FOREIGN PATENT DOCUMENTS

EP 0 167 297 A2 1/1986
EP 0 880 026 A1 11/1998
(Continued)

OTHER PUBLICATIONS

Notice of Reasons for Refusal for the corresponding Japanese application No. 2016-015632, dated Aug. 20, 2019.
(Continued)

*Primary Examiner* — Audrey B. Walter
*Assistant Examiner* — Dapinder Singh
(74) *Attorney, Agent, or Firm* — Global IP Counselors, LLP

(57) ABSTRACT

The heater 72 of the heater portion includes the linear portions 78 and the bend portions 77. A resistance value per unit length of the bend portions 77 at least at a temperature within a temperature range of no less than 700° C. and no more than 900° C. is lower than a resistance value per unit length of the linear portions 78.

20 Claims, 3 Drawing Sheets

(51) Int. Cl.
*H05B 3/26* (2006.01)
*G01N 27/406* (2006.01)

(58) Field of Classification Search
CPC .. H05B 3/283; H05B 3/141; H05B 2203/013; H05B 2203/003; H05B 2203/021; H05B 2203/032; H05B 2203/007; H05B 2203/011; H05B 2203/022; H05B 2203/005

See application file for complete search history.

(56) References Cited

U.S. PATENT DOCUMENTS

| | | | |
|---|---|---|---|
| 4,384,192 A | 5/1983 | Lowell et al. | |
| 4,419,213 A | 12/1983 | Oshima et al. | |
| 4,639,305 A * | 1/1987 | Shibata | G01N 27/4071 |
| | | | 204/426 |
| 5,444,228 A | 8/1995 | Gelus | |
| 5,895,591 A | 4/1999 | Kojima et al. | |
| 6,169,275 B1 | 1/2001 | Noda et al. | |
| 6,287,439 B1 * | 9/2001 | Kato | G01N 27/407 |
| | | | 219/209 |
| 6,836,207 B2 | 12/2004 | Nothhelfer et al. | |
| 2005/0199610 A1 | 9/2005 | Ptasienski et al. | |
| 2008/0210576 A1 | 9/2008 | Nair et al. | |
| 2008/0223849 A1 | 9/2008 | Naito et al. | |
| 2009/0250344 A1 | 10/2009 | Ohya et al. | |
| 2014/0102170 A1 | 4/2014 | Kato | |

FOREIGN PATENT DOCUMENTS

| | | |
|---|---|---|
| EP | 2 107 364 A1 | 10/2009 |
| JP | 57-137849 A | 8/1985 |
| JP | 60-259951 A | 12/1985 |
| JP | 10-318979 A | 12/1998 |
| JP | 2004-6345 A | 1/2004 |
| JP | 8571494 B2 | 7/2004 |
| JP | 4826461 B2 | 9/2011 |
| WO | 2013/005491 A1 | 1/2013 |

OTHER PUBLICATIONS

The Third Party Observations for the corresponding German patent application No. 10 2016 215 502.4, dated Jan. 26, 2018.

* cited by examiner

CERAMIC HEATER, SENSOR ELEMENT, AND GAS SENSOR

CROSS-REFERENCE TO RELATED APPLICATION

This is a divisional application of U.S. patent application Ser. No. 15/238,817, filed on Aug. 17, 2016, which claims priority to Japanese applications 2015-164213 filed on Aug. 21, 2015 and 2016-015632 filed on Jan. 29, 2016. The entire disclosures of U.S. patent application Ser. No. 15/238,817 and Japanese Patent Application Nos. 2015-164213 and 2016-015632 are hereby incorporated herein by reference.

BACKGROUND OF THE INVENTION

1. Field of the Invention

The present invention relates to a ceramic heater, a sensor element, and a gas sensor.

2. Description of the Related Art

Conventionally, a ceramic heater including a ceramic sheet and a heater pattern formed by being folded in a longitudinal direction of the ceramic sheet multiple times is known (for example, PTL 1). The heater pattern described in PTL 1 includes linear conductors formed along the longitudinal direction and folded conductors that connect the linear conductors to each other. It is also known that there is a pattern including linear portions along a short-length direction and folded portions that connect the linear portions to each other (for example, PTL 2).

CITATION LIST

Patent Literature

PTL 1: JP 4826461 B
PTL 2: JP 3571494 B

SUMMARY OF THE INVENTION

In such a ceramic heater, there are cases where a heating element is degraded and broken because a conductor forming the heating element oxidizes at a high temperature. In particular, there is the problem in that a bend portion such as a folded portion of the heater pattern is more susceptible to a stress due to thermal expansion compared with the linear portions, and accordingly, its breakage, for example, is more likely to occur due to degradation compared with the linear portions.

The present invention has been made to solve such a problem and has a major object to suppress degradation of the bend portion of the heating element.

The present invention adopts the following measure to achieve the major object.

A ceramic heater according to the present invention includes
a heating element including a linear portion and a bend portion whose resistance value per unit length at least at a temperature within a temperature range of no less than 700° C. and no more than 900° C. is lower than the resistance value per unit length of the linear portion, and
a ceramic body surrounding the heating element.

In the ceramic heater, the heating element includes the linear portion and the bend portion. The resistance value per unit length of the bend portion at least at a temperature within a temperature range of no less than 700° C. and no more than 900° C. is lower than the resistance value per unit length of the linear portion. Thus, the heat density (calorific value per unit length) of the bend portion is lower than the heat density of the linear portion at least at a temperature from 700° C. to 900° C., and the temperature of the bend portion is unlikely to increase. The higher temperature, the less the heating element is degraded. Accordingly, the temperature of the bend portion is less likely to increase compared with the linear portion, and consequently, degradation of the bend portion can be suppressed.

In the ceramic heater according to the present invention, a unit resistance value ratio R1/R2 at least at a temperature within the above temperature range may be 0.87 or less, where the resistance value per unit length of the bend portion is a unit resistance value R1 [μΩ/mm] and the resistance value per unit length of the linear portion is a unit resistance value R2 [μΩ/mm]. Thus, the effect of suppressing degradation of the bend portion is improved. In this case, the unit resistance value ratio R1/R2 at least at a temperature within the above temperature range is preferably 0.80 or less.

In the ceramic heater of the present invention, a sectional area of the bend portion that is perpendicular to a length direction may be larger than a sectional area of the linear portion that is perpendicular to a length direction. Thus, the resistance value per unit length of the bend portion is likely to be lower than the resistance value per unit length of the linear portion. In this case, the heating element may have a belt-like shape, and a thickness of the bend portion may be larger than or equal to a thickness of the linear portion. A sectional area ratio S2/S1 of a sectional area S2 [mm$^2$] of the linear portion that is perpendicular to the length direction to a sectional area S1 [mm$^2$] of the bend portion that is perpendicular to the length direction is preferably 0.87 or less. Thus, the unit resistance value ratio R1/R2 at least at a temperature within the above temperature range is likely to be 0.87 or less. The sectional area ratio S2/S1 is more preferably 0.80 or less.

In the ceramic heater according to the present invention, a volume resistivity of the bend portion at least at a temperature within the above temperature range may be lower than a volume resistivity of the linear portion. Thus, the resistance value per unit length of the bend portion is likely to be lower than the resistance value per unit length of the linear portion. In this case, a volume resistivity ratio ρ1/ρ2 that is a ratio of a volume resistivity ρ1 [μΩ·cm] of the bend portion to a volume resistivity ρ2 [μΩ·cm] of the linear portion is preferably 0.87 or less at least at a temperature within the above temperature range. Thus, the unit resistance value ratio R1/R2 at least at a temperature within the above temperature range is likely to be 0.87 or less. The volume resistivity ratio ρ1/ρ2 at least at a temperature within the above temperature range is more preferably 0.80 or less.

In the ceramic heater according to the present invention, the ceramic body may be a plate-like body having a longitudinal direction and a short-length direction, the heating element may include, as the linear portion, four or more of the linear portions that are arranged along the short-length direction and whose length direction is along the longitudinal direction, and the heating element may include, as the bend portion, plural one-end-side bend portions that connect the linear portions adjoining in the short-length direction to each other on one end side in the longitudinal direction and at least one another-end-side bend portion that connects the linear portions adjoining in the short-length direction to each other on another end side in the longitudinal direction.

In the ceramic heater according to the present invention, the ceramic body may be a plate-like body having a longitudinal direction and a short-length direction, the heating element may extend so as to be folded multiple times such that a folding direction is along the short-length direction and so as to be folded along the longitudinal direction as a whole and may include at least one region whose pitch of the fold along the short-length direction is dense and at least one region whose pitch of the fold along the short-length direction is sparse that are arranged in the longitudinal direction, the heating element may include, as part of the bend portion, first bend portions that are folded portions located in a highest temperature region of the at least one dense region that is heated to the highest temperature when the heating element generates heat and that have fold apexes facing each other in the short-length direction, and the resistance value per unit length of the first bend portions at least at a temperature within the above temperature range may be lower than the resistance value per unit length of the linear portion. The temperature of the first bend portions is likely to be high locally in the highest temperature region due to, for example, heat transfer between the first bend portions facing each other. Accordingly, the temperature of the first bend portions is particularly likely to be high among the bend portions and the first bend portions are likely to be degraded. The temperature of the linear portion, on the other hand, is less likely to be high compared with the first bend portions. In the ceramic heater, the resistance value per unit length of the first bend portions at least at a temperature within the above temperature range is lower than the resistance value per unit length of the linear portion, and accordingly, localized heating in the highest temperature region of the heating element can be further reduced. That is, an increase in the temperature of the first bend portions, which is likely to be high, can be further suppressed. This enables degradation of the first bend portions, which are particularly likely to be degraded among the bend portions, to be suppressed.

In the ceramic heater according to the present invention, the ceramic body may be a plate-like body having a longitudinal direction and a short-length direction, the heating element may extend so as to be folded multiple times such that a folding direction is along the short-length direction and so as to be folded along the longitudinal direction as a whole and may include at least one region whose pitch of the fold along the short-length direction is dense and at least one region whose pitch of the fold along the short-length direction is sparse that are arranged in the longitudinal direction, the heating element may include, as part of the bend portion, first bend portions that are folded portions located in a highest temperature region of the at least one dense region that is heated to the highest temperature when the heating element generates heat and that have fold apexes facing each other in the short-length direction and a third bend portion that is located in the highest temperature region and is located at positions away from the first bend portions toward an outside in the short-length direction, and the resistance value per unit length of the first bend portions at least at a temperature within the above temperature range may be lower than the resistance value per unit length of the third bend portion. The temperature of the first bend portions is likely to be high locally in the highest temperature region due to heat transfer between the first bend portions facing each other. Accordingly, the temperature of the first bend portions is particularly likely to be high among the bend portions and the first bend portions are likely to be degraded. The third bend portion, on the other hand, is located at positions away from the first bend portions toward the outside of the ceramic body, and accordingly, the temperature of the third bend portion is less likely to be high compared with the first bend portions. In the ceramic heater, the resistance value per unit length of the first bend portions at least at a temperature within the above temperature range is lower than the resistance value per unit length of the third bend portion, and accordingly, localized heating in the highest temperature region of the heating element can be further reduced. That is, an increase in the temperature of the first bend portions, which is likely to be high, can be further suppressed. This enables degradation of the first bend portions, which are particularly likely to be degraded among the bend portions, to be suppressed.

A sensor element according to the present invention includes the ceramic heater according to any one of the above aspects of the present invention.

A concentration of a specific gas in a measurement-object gas is detected.

The sensor element includes the ceramic heater according to any one of the above aspects. Accordingly, the same effects as the ceramic heater according to the present invention, such as the effect of suppressing degradation of the bend portion of the heating element, are achieved.

A gas sensor according to the present invention includes the sensor element according to the present invention.

The gas sensor includes the sensor element including the ceramic heater according to any one of the above aspects. Accordingly, the same effects as the ceramic heater and the sensor element according to the present invention, such as the effect of suppressing degradation of the bend portion of the heating element, are achieved.

DETAILED DESCRIPTION OF THE INVENTION

Figure 1:
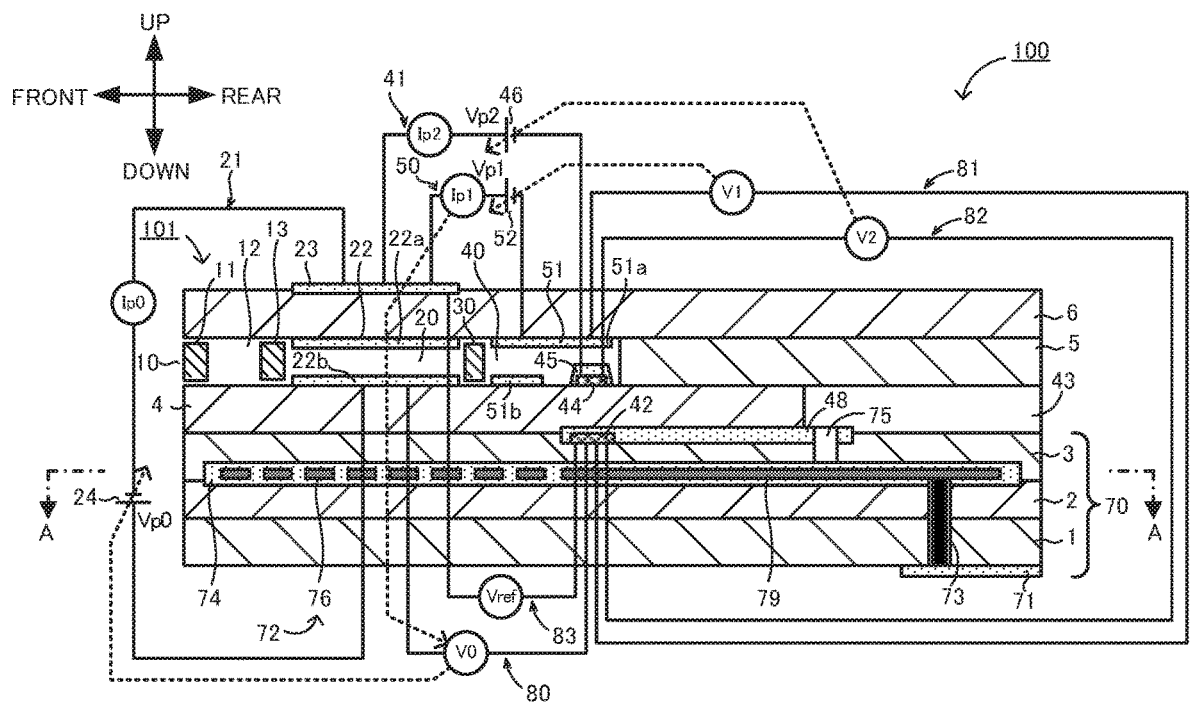
FIG. 1 is a schematic sectional diagram that schematically illustrates an example of the structure of a gas sensor 100.
Figure 2:
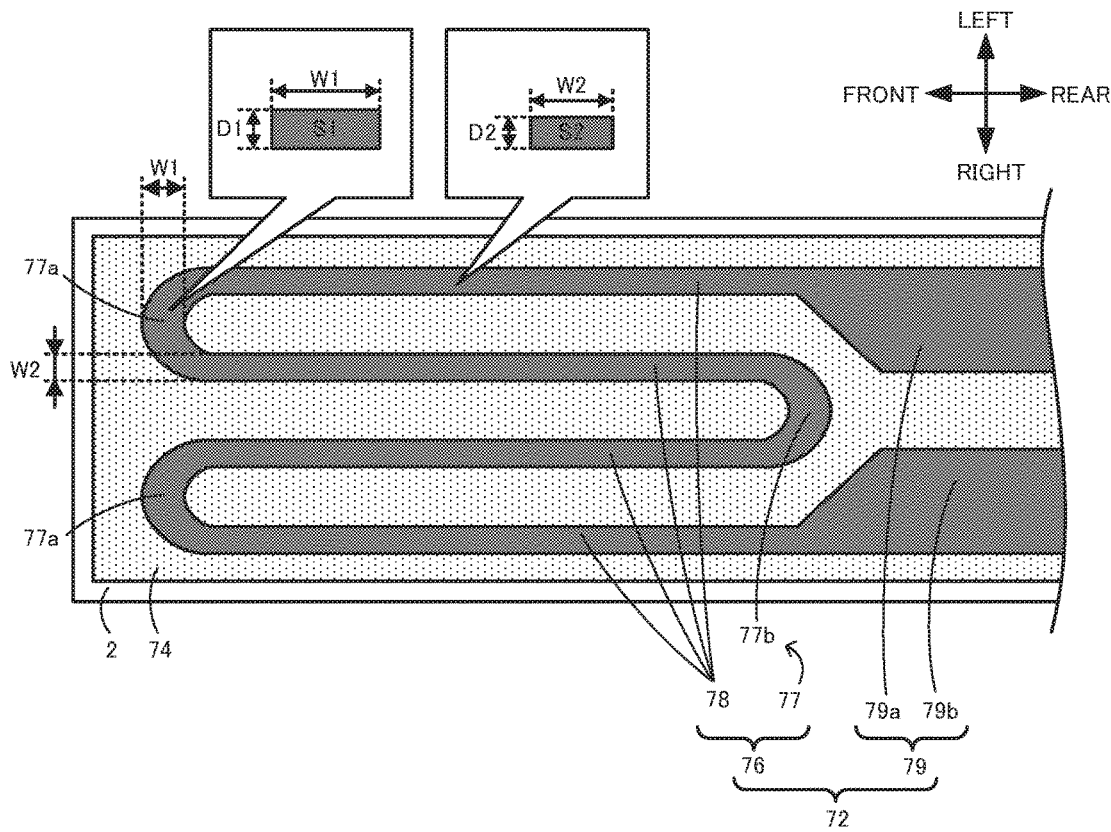
FIG. 2 is a sectional diagram along line A-A in FIG. 1.

An embodiment of the present invention will now be described with reference to the drawings. FIG. 1 is a schematic sectional diagram that schematically illustrates an example of the structure of a gas sensor 100, which is the embodiment of the present invention. FIG. 2 is a sectional diagram along line A-A in FIG. 1. The gas sensor 100, for example, detects the concentration of a specific gas such as NOx in a measurement-object gas such as an exhaust gas of motor vehicles by using a sensor element 101. The sensor element 101 has a long rectangular cuboid shape, the longitudinal direction (left-right direction in FIG. 1) of the sensor element 101 is referred to as a front-rear direction, and the thickness direction (vertical direction in FIG. 1) of the sensor element 101 is referred to as a vertical direction. The width direction (direction perpendicular to the front-rear direction and the vertical direction) of the sensor element 101 is referred to as a left-right direction.

The sensor element 101 is an element configured such that six layers of a first substrate layer 1, a second substrate layer 2, a third substrate layer 3, a first solid electrolyte layer 4, a spacer layer 5, and a second solid electrolyte layer 6 that are each formed of an oxygen-ion conducting solid electrolyte layer such as zirconia ($ZrO_2$) are stacked in this order from the lower side viewed in the figure. A solid electrolyte forming the six layers is fine and airtight. The sensor element 101 is manufactured, for example, in a manner in which a predetermined process, a circuit pattern printing, and other processes are performed on ceramic green sheets corresponding to the layers, and the sheets are then stacked and integrally formed into a piece by firing.

At a position of one end portion of the sensor element 101 between the lower surface of the second solid electrolyte layer 6 and the upper surface of the first solid electrolyte layer 4, a gas inlet 10, a first diffusion controlling portion 11, a buffer space 12, a second diffusion controlling portion 13, a first interior space 20, a third diffusion controlling portion 30, and a second interior space 40 are formed so as to be adjacent to each other and so as to be communication with each other in this order.

The gas inlet 10, the buffer space 12, the first interior space 20, and the second interior space 40 are spaces in the sensor element 101 that are formed such that the spacer layer 5 is hollowed, upper portions are partitioned by the lower surface of the second solid electrolyte layer 6, lower portions are partitioned by the upper surface of the first solid electrolyte layer 4, and side portions are partitioned by the side surfaces of the spacer layer 5.

The first diffusion controlling portion 11, the second diffusion controlling portion 13, and the third diffusion controlling portion 30 are each formed as two slits that are long from side to side (longitudinal direction of openings is a direction perpendicular to the figure). A portion extending from the gas inlet 10 to the second interior space 40 is also referred to as a gas flowing portion.

A reference-gas introducing space 43 is formed at a position that is far from the end side than the gas flowing portion and at a position at which a side portion is partitioned by a side surface of the first solid electrolyte layer 4 between the upper surface of the third substrate layer 3 and the lower surface of the spacer layer 5. For example, air as a reference gas when the concentration of NO is measured is introduced into the reference-gas introducing space 43.

An air introducing layer 48 is a layer made of porous ceramic, and a reference gas is introduced into the air introducing layer 48 via the reference-gas introducing space 43. The air introducing layer 48 is formed so as to cover a reference electrode 42.

The reference electrode 42 is an electrode formed such that the electrode is interposed between the upper surface of the third substrate layer 3 and the first solid electrolyte layer 4, and, as described above, the air introducing layer 48 in communication with the reference-gas introducing space 43 is disposed around the reference electrode 42. As described later, the use of the reference electrode 42 enables measurement of the concentration of oxygen (partial pressure of oxygen) in the first interior space 20 and the inside of the second interior space 40.

In the gas flowing portion, the gas inlet 10 is a region opened to the exterior space, and the measurement-object gas is taken in the inside of the sensor element 101 from the exterior space via the gas inlet 10. The first diffusion controlling portion 11 is a portion that gives a predetermined diffusion resistance to the measurement-object gas that has been taken in from the gas inlet 10. The buffer space 12 is a space formed to guide the measurement-object gas that has been introduced from the first diffusion controlling portion 11 toward the second diffusion controlling portion 13. The second diffusion controlling portion 13 is a portion that gives a predetermined diffusion resistance to the measurement-object gas that is introduced into the first interior space 20 from the buffer space 12. When the measurement-object gas is introduced from the outside of the sensor element 101 into the first interior space 20, the measurement-object gas that has been rapidly taken in the inside of the sensor element 101 from the gas inlet 10 as a result of variation in the pressure of the measurement-object gas in the exterior space (in the case where the measurement-object gas is an exhaust gas of a motor vehicle, pulsation of an exhaust pressure) is not directly introduced into the first interior space 20 but is introduced into the first interior space 20 after variation in the concentration of the measurement-object gas is removed through the first diffusion controlling portion 11, the buffer space 12, and the second diffusion controlling portion 13. Thus, the variation in the concentration of the measurement-object gas that is introduced into the first interior space 20 is suppressed to a negligible degree. The first interior space 20 is disposed as a space to adjust the partial pressure of oxygen in the measurement-object gas that has been introduced via the second diffusion controlling portion 13. The partial pressure of oxygen is adjusted by operation of a main pump cell 21.

The main pump cell 21 is an electrochemical pump cell formed of an inner pump electrode 22 including a ceiling electrode portion 22a disposed on substantially the entire surface of the lower surface of the second solid electrolyte layer 6 that faces the first interior space 20, an outer pump electrode 23 disposed in a region of the upper surface of the second solid electrolyte layer 6 that corresponds to the ceiling electrode portion 22a such that the outer pump electrode 23 is exposed to the exterior space, and the second solid electrolyte layer 6 interposed between these electrodes.

The inner pump electrode 22 is formed so as to extend over upper and lower solid electrolyte layers (the second solid electrolyte layer 6 and the first solid electrolyte layer 4) that partition the first interior space 20 and the spacer layer 5 forming side walls. Specifically, the ceiling electrode portion 22a is formed on the lower surface of the second solid electrolyte layer 6 that forms the ceiling surface of the first interior space 20, a bottom electrode portion 22b is formed on the upper surface of the first solid electrolyte layer 4 that forms the bottom surface of the first interior space 20, side electrode portions (not illustrated) are formed on side wall surfaces (inner surfaces) of the spacer layer 5 that form both side wall portions of the first interior space 20 such that the ceiling electrode portion 22a and the bottom electrode portion 22b are connected to each other, and the side electrode portions are disposed such that a tunnel shaped structure is formed at positions at which the side electrode portions are disposed.

The inner pump electrode 22 and the outer pump electrode 23 are formed as porous cermet electrodes (for example, cermet electrodes of Pt containing 1% of Au and $ZrO_2$). The inner pump electrode 22 that comes into contact with the measurement-object gas is formed of a material whose ability to reduce NOx components in the measurement-object gas is impaired.

In the main pump cell 21, oxygen in the first interior space 20 can be pumped out to the exterior space or oxygen in the exterior space can be pumped into the first interior space 20 in a manner in which a desired pump voltage Vp0 is applied across the inner pump electrode 22 and the outer pump electrode 23 and a pump current Ip0 is caused to flow in a positive direction or in a negative direction between the inner pump electrode 22 and the outer pump electrode 23.

In order to detect the concentration of oxygen (partial pressure of oxygen) in the atmosphere in the first interior space 20, an electrochemical sensor cell, that is, a main-pump controlling oxygen partial pressure detection sensor cell 80 is formed of the inner pump electrode 22, the second solid electrolyte layer 6, the spacer layer 5, the first solid electrolyte layer 4, the third substrate layer 3, and the reference electrode 42.

An electromotive force V0 in the main-pump controlling oxygen partial pressure detection sensor cell 80 is measured and the concentration of oxygen (partial pressure of oxygen) in the first interior space 20 is thereby known. Feedback control on the pump voltage Vp0 of a variable power supply 24 is implemented such that the electromotive force V0 is constant and the pump current Ip0 is thereby controlled. Thus, the concentration of oxygen in the first interior space 20 can be held at a predetermined constant value.

The third diffusion controlling portion 30 is a portion that gives a predetermined diffusion resistance to the measurement-object gas whose concentration of oxygen (partial pressure of oxygen) has been controlled by operation of the main pump cell 21 in the first interior space 20 and that guides the measurement-object gas toward the second interior space 40.

The second interior space 40 is formed as a space in which a process for measuring the concentration of a nitrogen oxide (NOx) in the measurement-object gas introduced via the third diffusion controlling portion 30 is performed. The concentration of NOx is measured mainly in the second interior space 40 in which the concentration of oxygen has been adjusted by an auxiliary pump cell 50 and by operation of a measuring pump cell 41.

In the second interior space 40, after the concentration of oxygen (partial pressure of oxygen) is adjusted in the first interior space 20 in advance, the partial pressure of oxygen in the measurement-object gas introduced via the third diffusion controlling portion 30 is adjusted by the auxiliary pump cell 50. Thus, the concentration of oxygen in the second interior space 40 can be kept constant with high precision, and accordingly, the gas sensor 100 enables highly precise measurement of the concentration of NOx.

The auxiliary pump cell 50 is an auxiliary electrochemical pump cell formed of an auxiliary pump electrode 51 including a ceiling electrode portion 51a disposed on substantially the entire lower surface of the second solid electrolyte layer 6 that faces the second interior space 40, the outer pump electrode 23 (a proper electrode outside the sensor element 101 suffices without being limited to the outer pump electrode 23), and the second solid electrolyte layer 6.

The auxiliary pump electrode 51 is disposed in the second interior space 40 at a tunnel shaped structure as in the inner pump electrode 22 disposed in the first interior space 20. That is, the ceiling electrode portion 51a is formed on the second solid electrolyte layer 6 that forms the ceiling surface of the second interior space 40, a bottom electrode portion 51b is formed on the first solid electrolyte layer 4 that forms the bottom surface of the second interior space 40, and there is the tunnel shaped structure in which side electrode portions (not illustrated) that connect the ceiling electrode portion 51a and the bottom electrode portion 51b to each other are formed on both wall surfaces of the spacer layer 5 that form side walls of the second interior space 40. The auxiliary pump electrode 51 is formed of a material whose ability to reduce NOx components in the measurement-object gas is impaired as in the inner pump electrode 22.

In the auxiliary pump cell 50, oxygen in the atmosphere in the second interior space 40 can be pumped out to the exterior space or oxygen can be pumped from the exterior space into the second interior space 40 in a manner in which a desired voltage Vp1 is applied across the auxiliary pump electrode 51 and the outer pump electrode 23.

In order to control the partial pressure of oxygen in the atmosphere in the second interior space 40, an electrochemical sensor cell, that is, an auxiliary-pump controlling oxygen partial pressure detection sensor cell 81 is formed of the auxiliary pump electrode 51, the reference electrode 42, the second solid electrolyte layer 6, the spacer layer 5, the first solid electrolyte layer 4, and the third substrate layer 3.

Pumping of the auxiliary pump cell 50 is performed with a variable power supply 52 whose voltage is controlled on the basis of an electromotive force V1 detected by the auxiliary-pump controlling oxygen partial pressure detection sensor cell 81. Thus, the partial pressure of oxygen in the atmosphere in the second interior space 40 is controlled to be a low partial pressure that does not substantially affect the measurement of NOx.

In addition, a pump current Ip1 thereof is used for control of the electromotive force of the main-pump controlling oxygen partial pressure detection sensor cell 80. Specifically, a gradient of the partial pressure of oxygen in the measurement-object gas that is introduced into the second interior space 40 from the third diffusion controlling portion 30 is controlled so as to be always constant in a manner in which the pump current Ip1 is input, as a control signal, to the main-pump controlling oxygen partial pressure detection sensor cell 80, and the electromotive force V0 thereof is controlled. In the case of a NOx sensor, the concentration of oxygen in the second interior space 40 is held at a constant value of about 0.001 ppm by operation of the main pump cell 21 and the auxiliary pump cell 50.

The measuring pump cell 41 measures the concentration of NOx in the measurement-object gas in the second interior space 40. The measuring pump cell 41 is an electrochemical pump cell formed of a measurement electrode 44 disposed on the upper surface of the first solid electrolyte layer 4 that faces the second interior space 40 and at a position apart from the third diffusion controlling portion 30, the outer pump electrode 23, the second solid electrolyte layer 6, the spacer layer 5, and the first solid electrolyte layer 4.

The measurement electrode 44 is a porous cermet electrode. The measurement electrode 44 also functions as a NOx reduction catalyst for reducing NOx contained in the atmosphere in the second interior space 40. The measurement electrode 44 is covered by a fourth diffusion controlling portion 45.

The fourth diffusion controlling portion 45 is a film formed of a ceramic porous body. The fourth diffusion controlling portion 45 serves a function to limit the amount of NOx that flows to the measurement electrode 44 and also functions as a protective film of the measurement electrode 44. In the measuring pump cell 41, oxygen produced by reaction of the nitrogen oxide in the atmosphere around the measurement electrode 44 can be pumped out and the amount of the produced oxygen can be detected as a pump current Ip2.

In order to detect the partial pressure of oxygen around the measurement electrode 44, an electrochemical sensor cell, that is, a measuring-pump controlling oxygen partial pressure detection sensor cell 82 is formed of the first solid electrolyte layer 4, the third substrate layer 3, the measurement electrode 44, and the reference electrode 42. A variable power supply 46 is controlled on the basis of an electromotive force V2 detected by the measuring-pump controlling oxygen partial pressure detection sensor cell 82.

The measurement-object gas guided into the second interior space 40 reaches the measurement electrode 44 via the fourth diffusion controlling portion 45 in a condition that the partial pressure of oxygen is controlled. The nitrogen oxide in the measurement-object gas around the measurement electrode 44 is reduced and oxygen is produced ($2NO \rightarrow N_2 + O_2$). The produced oxygen is pumped by the measuring pump cell 41. At this time, a voltage Vp2 of the variable power supply 46 is controlled such that the electromotive force V2 detected by the measuring-pump controlling oxygen partial pressure detection sensor cell 82 is constant. The amount of oxygen produced around the measurement electrode 44 is proportional to the concentration of the nitrogen oxide in the measurement-object gas, and accordingly, the concentration of the nitrogen oxide in the measurement-object gas is calculated by using the pump current Ip2 in the measuring pump cell 41.

In the case where an oxygen partial pressure detection mechanism as an electrochemical sensor cell is formed of a combination of the measurement electrode 44, the first solid electrolyte layer 4, the third substrate layer 3, and the reference electrode 42, an electromotive force depending on a difference between the amount of oxygen produced by reduction of NOx components in the atmosphere around the measurement electrode 44 and the amount of oxygen contained in a reference air can be detected. This enables the concentration of the NOx components in the measurement-object gas to be calculated.

An electrochemical sensor cell 83 is formed of the second solid electrolyte layer 6, the spacer layer 5, the first solid electrolyte layer 4, the third substrate layer 3, the outer pump electrode 23, and the reference electrode 42. The partial pressure of oxygen in the measurement-object gas outside the sensor can be detected by using an electromotive force Vref obtained by the sensor cell 83.

In the gas sensor 100 configured as above, a measurement-object gas whose partial pressure of oxygen is always held at a constant low value (value that does not substantially affect measurement of NOx) is provided to the measuring pump cell 41 by operation of the main pump cell 21 and the auxiliary pump cell 50. Accordingly, the concentration of NOx in the measurement-object gas can be known on the basis of the pump current Ip2 that is caused to flow as the result that oxygen produced by reduction of NOx substantially in proportion to the concentration of NOx in the measurement-object gas is pumped out by the measuring pump cell 41.

The sensor element 101 also includes a heater portion 70 that serves a function for temperature adjustment that allows the sensor element 101 to be heated and kept warm in order to improve oxygen-ion conductivity of a solid electrolyte. The heater portion 70 includes a heater connector electrode 71, a heater 72, a through-hole 73, a heater insulating layer 74, and a pressure diffusing hole 75. The heater portion 70 also includes the first substrate layer 1, the second substrate layer 2, and the third substrate layer 3 that are made of ceramic. The heater portion 70 is formed as a ceramic heater including the heater 72, and the second substrate layer 2 and the third substrate layer 3 that surround the heater 72. As illustrated in FIG. 2, the heater 72 includes a heating portion 76 and lead portions 79.

The heater connector electrode 71 is an electrode formed such that the electrode is in contact with the lower surface of the first substrate layer 1. Connecting the heater connector electrode 71 to an external power supply enables electricity to be supplied from the outside to the heater portion 70.

The heating portion 76 of the heater 72 is an electric resistance formed such that the electric resistance is interposed between the second substrate layer 2 and the third substrate layer 3 from above and below. The lead portions 79 of the heater 72 are connected to the heater connector electrode 71 through the through-hole 73. When electricity is supplied from the outside via the heater connector electrode 71, the heating portion 76 generates heat, and the solid electrolyte forming the sensor element 101 is heated and kept warm.

The heating portion 76 of the heater 72 is buried in the entire region extending from the first interior space 20 to the second interior space 40, and the temperature of the entire sensor element 101 can be adjusted to a temperature at which the solid electrolyte is activated.

The heater insulating layer 74 is an insulating layer formed of an insulator such as alumina on the upper and lower surfaces of the heater 72. The heater insulating layer 74 is formed to provide electrical insulation between the second substrate layer 2 and the heater 72 and electrical insulation between the third substrate layer 3 and the heater 72.

The pressure diffusing hole 75 is a region formed such that the region extends through the third substrate layer 3 and communicates with the reference-gas introducing space 43 and is formed to relieve an increase in inner pressure due to an increase in temperature of the inside of the heater insulating layer 74.

The heating portion 76 and the lead portions 79 of the heater 72 will be described in detail. The heating portion 76 is a resistance heating element, and, as illustrated in FIG. 2, has a belt-like shape as drawn in one continuous stroke in which both ends are connected to the lead portions 79. The heating portion 76 includes plural bend portions 77 (three bend portions in the embodiment) and plural linear portions 78 (four linear portions in the embodiment). The bend portions 77 and the linear portions 78 are electrically connected in series. The heating portion 76 has a bilateral symmetry shape.

The linear portions 78 are arranged along the short-length direction (left-right direction) of the sensor element 101 so as to be equally spaced. The length direction of each of the linear portions 78 is along the longitudinal direction (front-rear direction) of the sensor element 101. In the embodiment, the linear portions 78 are disposed such that the length direction is parallel to the front-rear direction. The leftmost linear portion 78 among the linear portions 78 is connected at the rear end thereof to a first lead 79a. The rightmost linear portion 78 among the linear portions 78 is connected at the rear end thereof to a second lead 79b.

Each of the bend portions 77 connects the linear portions 78 adjoining in the left-right direction to each other. The bend portions 77 include front-end-side bend portions 77a that connect the adjoining linear portions 78 to each other on the front end side (one end side) and a rear-end-side bend portion 77b that connects the adjoining linear portions 78 to each other on the rear end side (the other end side). In the embodiment, the bend portions 77 include two front-end-side bend portions 77a and one rear-end-side bend portion 77b. Each of the bend portions 77 is bent into a curved shape and has an arc shape of a semicircle. The bend portions 77 may have a bent shape like a broken line.

The heating portion 76 in the embodiment is made of cermet containing a precious metal and ceramic (for example, cermet of platinum (Pt) and alumina ($Al_2O_3$)). The heating portion 76 is not limited to cermet provided that the heating portion 76 contains a conductive material such as a precious metal. Examples of the precious metal used for the heating portion 76 include a metal of at least one of platinum, rhodium (Rh), aurum (Au), and palladium (Pd), or an alloy thereof.

The resistance value per unit length of the bend portions 77 is lower than the resistance value per unit length of the linear portions 78 at least at a temperature within a temperature range of no less than 700° C. and no more than 900° C., which is a temperature range at which the heating portion 76 may be heated when used. In other words, a unit resistance value ratio R1/R2 at least at a temperature within the above temperature range is less than 1 where the resistance value per unit length of the bend portions 77 is a unit resistance value R1 [$\mu\Omega$/mm], and the resistance value per unit length of the linear portions 78 is a unit resistance value R2 [$\mu\Omega$/mm]. Thus, the heat density (calorific value per unit length) of the bend portions 77 is lower than the heat density of the linear portions 78 at least at a temperature from 700° C. to 900° C., and the temperature of the bend portions 77 is unlikely to increase. The higher the temperature, the more likely the heating portion 76 is degraded due to oxidation (for example, oxidation of Pt that is a precious metal component in the heating portion 76). When the unit resistance value ratio R1/R2 is less than 1, an increase in the temperature of the bend portions 77 can be suppressed, and degradation of the bend portions 77 can be suppressed more than the case where the unit resistance value ratio R1/R2 is 1 or more.

The length direction of the bend portions 77 and the linear portions 78 is an axial direction of the bend portions 77 and the linear portions 78, in other words, a direction in which electricity flows. The unit resistance value R1 is the average value of the resistance value per unit length of the bend portions 77. Likewise, the unit resistance value R2 is the average value of the resistance value per unit length of the linear portions 78. Accordingly, even when part of the bend portions 77 is a portion having a resistance value per unit length larger than the resistance value per unit length of the linear portions 78, it is only necessary for the resistance value per unit length of the bend portions 77 as a whole to be lower than the resistance value per unit length of the linear portions 78. However, the resistance value per unit length is preferably lower than the unit resistance value R2 at any portion of the bend portions 77. The unit resistance value ratio R1/R2 of the heating portion 76 is preferably less than 1 at any temperature within the above temperature range. The unit resistance value ratio R1/R2 of the heating portion 76 at least at a temperature within the above temperature range is preferably 0.87 or less, more preferably 0.80 or less. The unit resistance value ratio R1/R2 may be 0.5 or more at any temperature within the above temperature range.

In the embodiment, the bend portions 77 and the linear portions 78 are made of the same material (the above cermet containing platinum), and the sectional area S1 [$mm^2$] of the bend portions 77 that is perpendicular to the length direction is larger than the sectional area S2 [$mm^2$] of the linear portions 78 that is perpendicular to the length direction. That is, the sectional area ratio S2/S1 of the heating portion 76 is less than 1. Thus, the unit resistance value ratio R1/R2 is less than 1 at any temperature within a temperature range of no less than 700° C. and no more than 900° C. The sectional area ratio S2/S1 is preferably 0.87 or less, more preferably 0.80 or less. The sectional area ratio S2/S1 may be adjusted, for example, at least in a manner in which the width W1 of the bend portions 77 is caused to be larger than the width W2 of the linear portions 78, or the thickness D1 of the bend portions 77 is caused to be larger than the thickness D2 of the linear portions 78. When width W1>width W2, for example, thickness D1<thickness D2 may hold, thickness D1=thickness D2 may hold, or thickness D1>thickness D2 may hold, provided that the sectional area ratio S2/S1 is less than 1. Likewise, when thickness D1>thickness D2, width W1<width W2 may hold, width W1=width W2 may hold, or width W1>width W2 may hold, provided that the sectional area ratio S2/S1 is less than 1. The values of the sectional areas S1 and S2 are the average values in the bend portions 77 and the linear portions 78 as in the unit resistance values R1 and R2. In the embodiment, the sectional area of the linear portions 78 is the same value (=sectional area S2) at any portion. The sectional area of the bend portions 77 is equal to the sectional area of the linear portions 78 at portions at which the bend portions 77 and the linear portions 78 are connected to each other and the bend portions 77 are formed such that the sectional area increases in proportion to a distance from the linear portions 78. That is, the bend portions 77 are each formed such that the sectional area of a section (section that traverses a portion protruding forward the most, for example, in the bend portions 77a) of a central portion in the left-right direction becomes largest. The sectional area ratio S2/S1 may be 0.5 or more. The widths W1 and W2 may be no less than 0.05 mm and no more than 1.5 mm. The thicknesses D1 and D2 may be no less than 0.003 mm and no more than 0.1 mm.

The lead portions 79 include the first lead 79a disposed on the left rear side of the heating portion 76 and the second lead 79b disposed on the right rear side. The first and second leads 79a and 79b are leads for energizing the heating portion 76 and are connected to the heater connector electrode 71. The first lead 79a is a positive lead, and the second lead 79b is a negative lead. When a voltage is applied across the first and second leads 79a and 79b, an electric current runs through the heating portion 76, and the heating portion 76 generates heat. The lead portions 79 is a conductor and the resistance value per unit length of the lead portions 79 is lower than the resistance value per unit length of the heating portion 76. Accordingly, the lead portions 79 scarcely generate heat during energizing unlike the heating portion 76. For example, the lead portions 79 are made of a material having a lower volume resistivity or has a larger sectional area compared with the heating portion 76, and accordingly, the resistance value per unit length of the lead portions 79 is lower than the resistance value per unit length of the heating portion 76. In the embodiment, the lead portions 79 contain a higher proportion of a precious metal compared with the heating portion 76 and accordingly, the volume resistivity of the lead portions 79 is lower than the volume resistivity of the heating portion 76. In addition, the width of the lead portions 79 is larger than the width of the heating portion 76, and accordingly, the sectional area of the lead portions 79 is larger than the sectional area of the heating portion 76. The width of the lead portions 79 in the left-right direction is equal to the width of the linear portions 78 at portions at which the lead portions 79 are connected to the linear portions 78 on their front side but gradually increases on the rear side.

A method of manufacturing the gas sensor 100 thus configured will be described below. Six ceramic green sheets that are not subjected to firing and contain an oxygen-ion conducting solid electrolyte such as zirconia as a ceramic component are first prepared. Sheet holes used for positioning when printing or stacking, required through-holes, and so on are formed in the green sheets in advance. A space that will be the gas flowing portion is formed in the green sheet that will be the spacer layer 5 in advance by, for example, a punching process. Pattern printing processes in which various patterns are formed on the ceramic green sheets and drying processes are performed so as to correspond to the first substrate layer 1, the second substrate layer 2, the third substrate layer 3, the first solid electrolyte layer 4, the spacer layer 5, and the second solid electrolyte layer 6. Specific patterns to be formed are, for example, patterns of the above electrodes, lead wires connected to the electrodes, the air introducing layer 48, and the heater 72. The pattern printing is performed by applying pattern forming pastes prepared depending on properties required for subjects to be formed to the green sheets by using a known screen printing technique. A mixture of a raw material (for example, a precious metal and ceramic particles) for the material of the heater 72, an organic binder, an organic solvent, and so on is used for the pattern forming paste that will be the heater 72.

At this time, the pattern that will be the heater 72 is formed such that the unit resistance value ratio R1/R2 is less than 1, that is, the sectional area ratio S2/S1 is less than 1. For example, to satisfy width W1>width W2, a mask having a shape that enables formation of such a pattern is used. To satisfy thickness D1>thickness D2, for example, the viscosity of the paste for forming the pattern of portions that will be the bend portions 77 is increased or the number of printing processes when the pattern of portions that will be the bend portions 77 is formed is increased compared with the pattern of portions that will be the linear portions 78.

After the various patterns are formed, the green sheets are dried. The drying process is performed by using a known drying means. After the pattern printing and drying are finished, adhesive pastes for stacking and sticking the green sheets corresponding to the layers to each other are printed and dried. The green sheets on which the adhesive pastes have been formed are stacked in a predetermined order while their positions are set by using the sheet holes, and a pressure bonding process is performed in a manner in which the green sheets are bonded by pressure bonding under predetermined temperature and pressure conditions and formed into a multilayer body. The multilayer body thus obtained includes a plurality of the sensor elements 101. The multilayer body is cut in the size of each sensor element 101. A piece of the cut multilayer body is subjected to firing at a predetermined firing temperature and the sensor element 101 is obtained.

After the sensor element 101 is obtained, a sensor assembly that incorporates the sensor element 101 is manufactured, and a protective cover, for example, is attached to obtain the gas sensor 100. Such a method of manufacturing a gas sensor has been known except for causing the unit resistance value ratio R1/R2 to be less than 1 and is disclosed in, for example, International Publication No. WO2013/005491.

In the gas sensor 100 thus configured, in use, the heater 72 is connected to a power supply (for example, an alternator of a motor vehicle) with the heater connector electrode 71 interposed therebetween, and a direct voltage (for example, 12 to 14 V) is applied across the first lead 79a and the second lead 79b. The applied voltage causes a current to flow through the heating portion 76 and the heating portion 76 generates heat. Thus, the temperature of the entire sensor element 101 is adjusted to a temperature (for example, 700° C. to 900° C.) at which the solid electrolyte (the layers 1 to 6) is activated. At this time, the temperature of the heating portion 76 is high. The higher the temperature, the more likely the heating portion 76 oxidizes and is degraded. Moreover, a bend portion is typically more susceptible to a stress due to thermal expansion compared with a linear portion, and its breakage due to degradation, for example, is more likely to occur compared with a linear portion. More specifically, a bend portion is likely to crack minutely because of being affected by a stress due to thermal expansion. The crack increases the surface area of the bend portion and facilitates oxidation. When the crack further extends, breakage of the bend portion, for example, is likely to occur and its lifetime is likely to be shortened. However, in the heater portion 70 in the embodiment, the unit resistance value ratio R1/R2 at least at a temperature from 700° C. to 900° C. is less than 1. Thus, at least at a temperature from 700° C. to 900° C., the heat density of the bend portions 77 is lower than the heat density of the linear portions 78 at that temperature, and the temperature of the bend portions 77 is unlikely to increase. Consequently, degradation of the bend portions 77 can be suppressed, and the lifetime of the bend portions 77 is increased.

The relationship between the components in the embodiment and the components according to the present invention is made clear here. The heater portion 70 in the embodiment corresponds to the ceramic heater according to the present invention, the heater 72 corresponds to the heating element, the bend portion 77 corresponds to the bend portion, the linear portion 78 corresponds to the linear portion, and the first substrate layer 1, the second substrate layer 2, and the third substrate layer 3 correspond to the ceramic body.

According to the gas sensor 100 in the embodiment described in detail, the heater 72 of the heater portion 70 includes the linear portions 78 and the bend portions 77. The resistance value per unit length of the bend portions 77 at least at a temperature within a temperature range of no less than 700° C. and no more than 900° C. is lower than the resistance value per unit length of the linear portions. Thus, the heat density of the bend portions 77 is lower than the heat density of the linear portions 78 at least at a temperature from 700° C. to 900° C., and degradation of the bend portions 77 can be suppressed. Accordingly, breakage of the bend portions 77, for example, is unlikely to occur, and the lifetime of the bend portions 77 is increased. Since the lifetime of the bend portions 77 whose breakage, for example, is likely to occur due to its degradation is increased, the lifetime of the entire heating portion 76 is increased.

When the unit resistance value ratio R1/R2 at least at a temperature within the above temperature range is 0.87 or less, degradation of the bend portions 77 is further suppressed. When the unit resistance value ratio R1/R2 is 0.80 or less, degradation of the bend portions 77 is still further suppressed. Since the sectional area of the bend portions 77 that is perpendicular to the length direction is larger than the sectional area of the linear portions 78 that is perpendicular to the length direction, the resistance value per unit length (unit resistance value R1) of the bend portions 77 is likely to be lower than the unit resistance value R2 of the linear portions 78. The heating portion 76 has a belt-like shape, and the thickness of the bend portions 77 is larger than or equal to the thickness of the linear portions 78. Since the sectional area ratio S2/S1 is 0.87 or less, the unit resistance value ratio R1/R2 at least at a temperature within the above temperature range is likely to be 0.87 or less. When the sectional area ratio S2/S1 is 0.80 or less, the unit resistance value ratio R1/R2 at least at a temperature within the above temperature range is likely to be 0.80 or less.

The ceramic body (the first substrate layer 1, the second substrate layer 2, and the third substrate layer 3) is a plate-like body having the longitudinal direction and the short-length direction, the heater 72 includes, as the linear portions 78, four or more linear portions 78 whose length direction is along the longitudinal direction (front-rear direction) that are arranged along the short-length direction (left-right direction), and the heater 72 includes, as the bend portions 77, the plural front-end-side bend portions 77a that connect the linear portions 78 adjoining in the short-length direction to each other on the front end side in the longitudinal direction, and at least one rear-end-side bend portion 77b that connects the linear portions 78 adjoining in the short-length direction to each other on the rear end side in the longitudinal direction. The sensor element 101 includes the heater portion 70 and detects the concentration of a specific gas in the measurement-object gas. The gas sensor 100 includes the sensor element 101.

It goes without saying that the present invention is not limited to the embodiment and can be carried out in various aspects within the technical scope of the present invention.

For example, although the sectional area ratio S2/S1 is less than 1 in the embodiment, it is only necessary for the unit resistance value ratio R1/R2 to be less than 1 at least at a temperature within a temperature range from 700° C. to 900° C. For example, the volume resistivity of the bend portions 77 at least at a temperature within the above temperature range may be lower than the volume resistivity of the linear portions 78. That is, a volume resistivity ratio $\rho1/\rho2$ that is a ratio of a volume resistivity $\rho1$ [$\mu\Omega\cdot cm$] of the bend portions 77 to a volume resistivity $\rho2$ [$\mu\Omega\cdot cm$] of the linear portions 78, may be less than 1 at least at a temperature within the above temperature range. Also in this case, the unit resistance value ratio R1/R2 at least at a temperature within the above temperature range can be less than 1, and degradation of the bend portions 77 is suppressed to increase the lifetime of the heater 72. The volume resistivity ratio $\rho1/\rho2$ is preferably 0.87 or less, more preferably 0.80 or less at least at a temperature within the above temperature range. For example, when the proportion of the precious metal (conductor) contained in the bend portions 77 is higher than the proportion of the precious metal contained in the linear portions 78, the volume resistivity $\rho1$ can be lower than the volume resistivity $\rho2$. Alternatively, for example, when the main component of the linear portions 78 is platinum, and a precious metal (such as rhodium or aurum) having a volume resistivity lower than the volume resistivity of platinum is added to the bend portions 77 in addition to or instead of platinum, the volume resistivity $\rho1$ can be lower than the volume resistivity $\rho2$. That is, the bend portions 77 may contain a precious metal that is not contained in the linear portions 78 and that has a volume resistivity lower than the volume resistivity of the precious metal contained in the linear portions 78. Alternatively, also when the bend portions 77 contain a material having a resistance temperature coefficient (unit: [%/° C.]) smaller than the resistance temperature coefficient of the precious metal of the main component in a larger amount than the amount in the linear portions 78, the volume resistivity $\rho1$ at least at a temperature within the above temperature range can be lower than the volume resistivity $\rho2$. Examples of such a material having a smaller resistance temperature coefficient include Nichrome (an alloy containing nickel (Ni) and chromium (Cr)), Kanthal (trademark: an alloy containing iron, chromium, and aluminum), and molybdenum disilicide ($MoSi_2$). The values of the volume resistivities $\rho1$ and $\rho2$ are the average values in the bend portions 77 and the linear portions 78 as in the unit resistance values R1 and R2. The volume resistivity ratio $\rho1/\rho2$ may be 0.5 or more at any temperature within the above temperature range.

In the heater portion 70, there may be a combination of a sectional area ratio S2/S1 of less than 1 and a volume resistivity ratio $\rho1/\rho2$ of less than 1. For example, the product (=unit resistance value ratio R1/R2) of the sectional area ratio S2/S1 and the volume resistivity ratio $\rho1/\rho2$ at least at a temperature within the above temperature range may be less than 1, 0.87 or less, or 0.80 or less. Even when the sectional area ratio S2/S1 is less than 1, the materials of the bend portions 77 and the linear portions 78 may differ.

Figure 3:
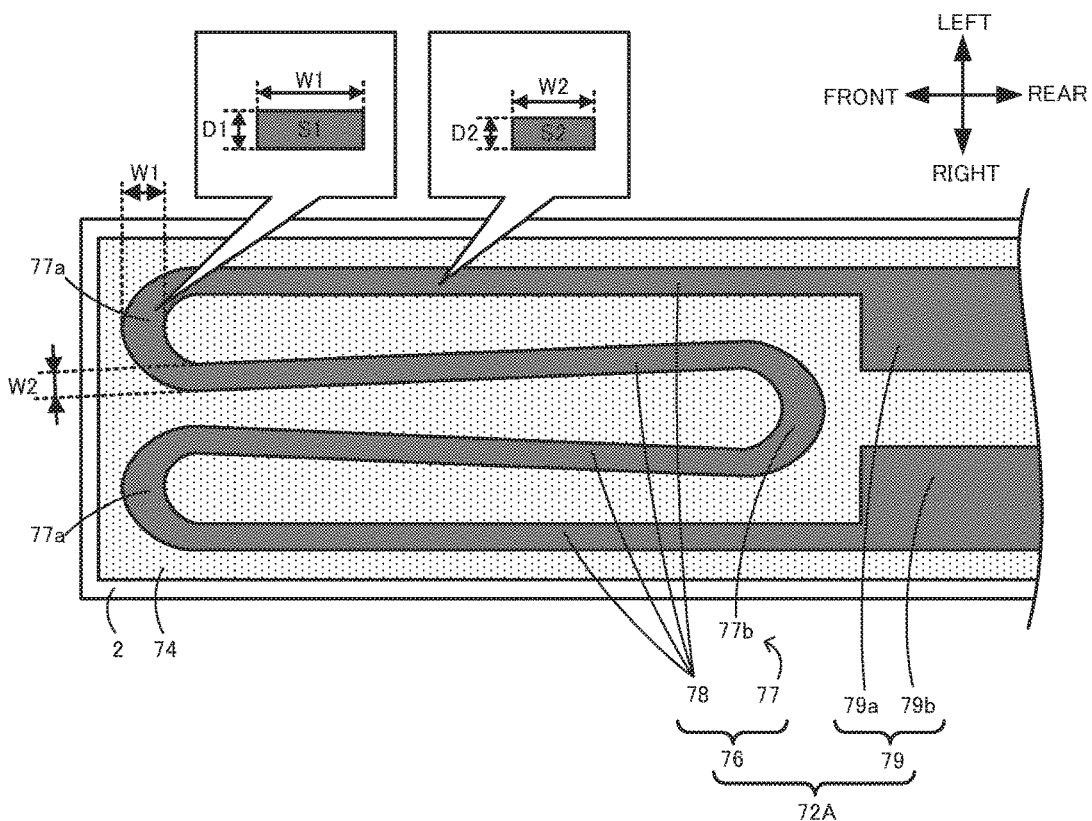
FIG. 3 is an explanatory view of a heater 72A in a modification.

The shape (pattern) of the heater 72 of the heater portion 70 is not limited to the embodiment. The heater 72 only needs to include the bend portion 77 and the linear portion 78. For example, the length direction of the linear portions 78 may not be parallel to the longitudinal direction (front-rear direction) of the heater portion 70 provided that the length direction is along the longitudinal direction. FIG. 3 is an explanatory view of a heater 72A in a modification. In the heater 72A, the length direction of two linear portions 78 on the central side in the left-right direction among four linear portions 78 is along the longitudinal direction but is inclined with respect to the longitudinal direction. Specifically, the second linear portion 78 from the left is inclined so as to gradually head toward the left while extending toward the rear side, and the second linear portion 78 from the right is inclined so as to gradually head toward the right while extending toward the rear side. Thus, the radius (radius of curvature) of the bend portions 77 can be larger than the radius of the heater 72 having the shape illustrated in FIG. 2. In other words, the width of the heating portion 76 in the left-right direction can be decreased without decreasing the radius of curvature of the bend portions 77. Unlike FIG. 2, the width of the lead portions 79 is larger than the width of the linear portions 78 also at portions at which the lead portions 79 are connected to the linear portions 78 on their front side. The shape of the lead portions 79 may be the same as in FIG. 2, and, in the heater 72 in FIG. 2, the shape of the lead portions 79 may be the same as in FIG. 3. The heater 72A in the modification can also achieve the same effects as the embodiment. For example, when the unit resistance value ratio R1/R2 at least at a temperature within a temperature range from 700° C. to 900° C. is less than 1, degradation of the bend portions 77 can be inhibited.

In the embodiment, the heating portion 76 includes three bend portions 77 and four linear portions 78, but this is not a limitation. For example, the number of the bend portions 77 may be three or more, or two, or the number of the bend portion 77 may be one, and the number of the linear portions 78 may be four or more, or three or less. The number of the linear portions 78 may be an even number of four or more. With regard to the number of the front-end-side bend portions 77a and the rear-end-side bend portion 77b, although the member of the front-end-side bend portions 77a is two and the number of the rear-end-side bend portion 77b is one in the embodiment, the number may be changed in accordance with the number of the connected linear portions 78. For example, the number of the front-end-side bend portion 77a may be one or the number of the front-end-side bend portions 77a may be two. At least one rear-end-side bend portion 77b suffices. When the number of the linear portions 78 is two and the number of the bend portion 77 is one, the heating portion 76 may not include the rear-end-side bend portion 77b.

Figure 4:
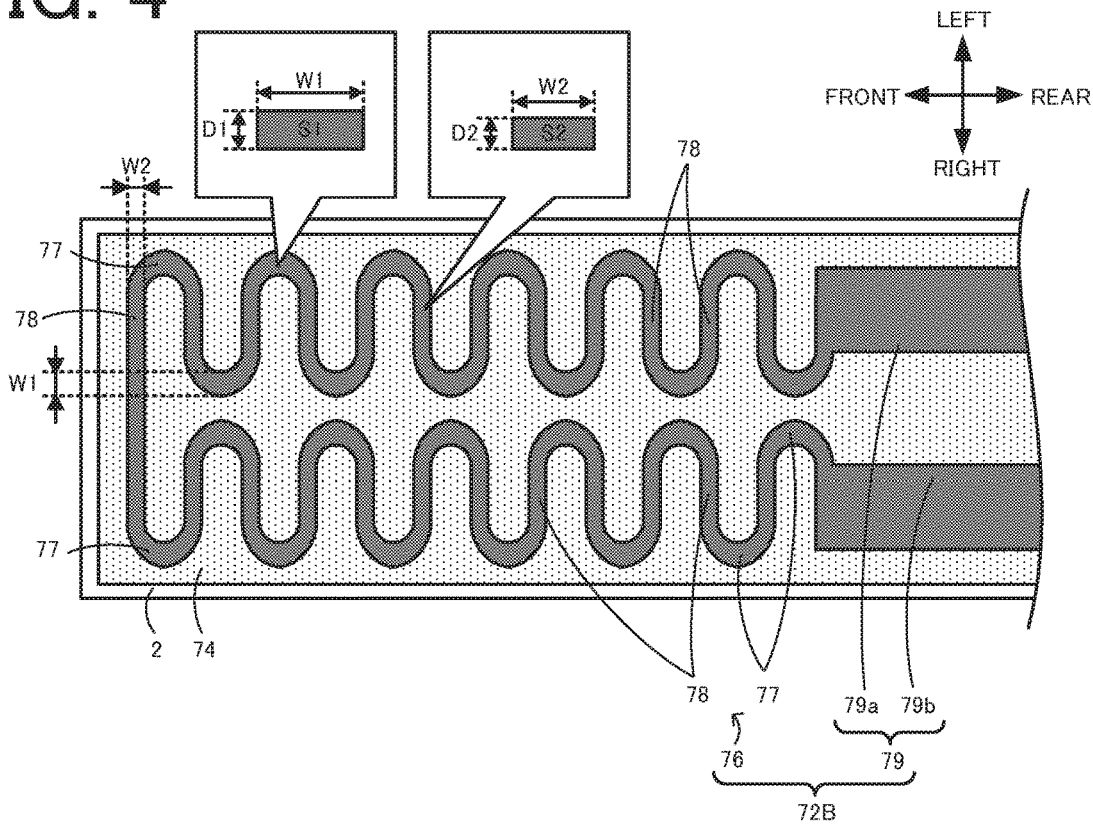
FIG. 4 is an explanatory view of a heater 72B in a modification.

Although the length direction of the linear portions 78 is along the longitudinal direction (front-rear direction) in the embodiment, the length direction of the linear portions 78 may be along the short-length direction of the heater portion 70. In this case, the linear portions 78 may be arranged along the longitudinal direction of the heater portion 70, and the bend portions 77 may connect the linear portions 78 adjoining in the longitudinal direction to each other on one end side or the other end side in the short-length direction. FIG. 4 is an explanatory view of a heater 72B in a modification in this case. The heater 72B in such a modification also achieves the same effects as the embodiment. For example, when the unit resistance value ratio R1/R2 at least at a temperature within a temperature range from 700° C. to 900° C. is less than 1, degradation of the bend portions 77 can be suppressed.

In the embodiment, the bend portions 77 are formed such that the sectional area gradually increases with increasing a distance from the linear portions 78, but this is not a limitation. For example, the sectional area of the bend portions 77 may be the same value (=sectional area S1) at any portion. In this case, steps may be produced at portions at which the linear portions 78 and the bend portions 77 are connected to each other. It is, however, preferable that there no step in the heating portion 76. Accordingly, in the case where the sectional area of the bend portions 77 differs from the sectional area of the linear portions 78, as illustrated in FIG. 2, the bend portions 77 are preferably formed such that the sectional area gradually varies. The sectional area of the linear portions 78 is the same value (=sectional area S2) at any portion, but this is not a limitation. For example, in the linear portions 78, there may be a portion whose sectional area gradually varies. In the case where the heating portion 76 includes the plural bend portions 77, at least one of the bend portions 77 may have a sectional area different from the sectional area of the other bend portions 77. The same is true in the case of the linear portions 78.

Although the heater 72 has a belt-like shape in the embodiment, the heater 72 is not limited thereto and may have a wire-like shape (for example, a circle or ellipse in section).

Although the gas sensor 100 including the heater portion 70 is described in the embodiment, the present invention may be the sensor element 101 as a single item, or the heater portion 70 as a single item, that is, a ceramic heater as a single item. The heater portion 70 includes the first substrate layer 1, the second substrate layer 2, and the third substrate layer 3, but only needs to have a ceramic body surrounding the heater 72. For example, lower layers of the heater 72 may not be two layers of the first substrate layer 1 and the second substrate layer 2, but the heater 72 may have only one lower layer. Although the heater portion 70 includes the heater insulating layer 74, the heater insulating layer 74 may be omitted provided that the ceramic body (for example, the first substrate layer 1 and the second substrate layer 2) surrounding the heater 72 is made of an insulating material (for example, alumina ceramic). The size of the sensor element 101 may be that, for example, the length in the front-rear direction is no less than 25 mm and no more than 100 mm, the width in the left-right direction is no less than 2 mm and no more than 10 mm, and the thickness in the vertical direction is no less than 0.5 mm and no more than 5 mm.

Figure 5:
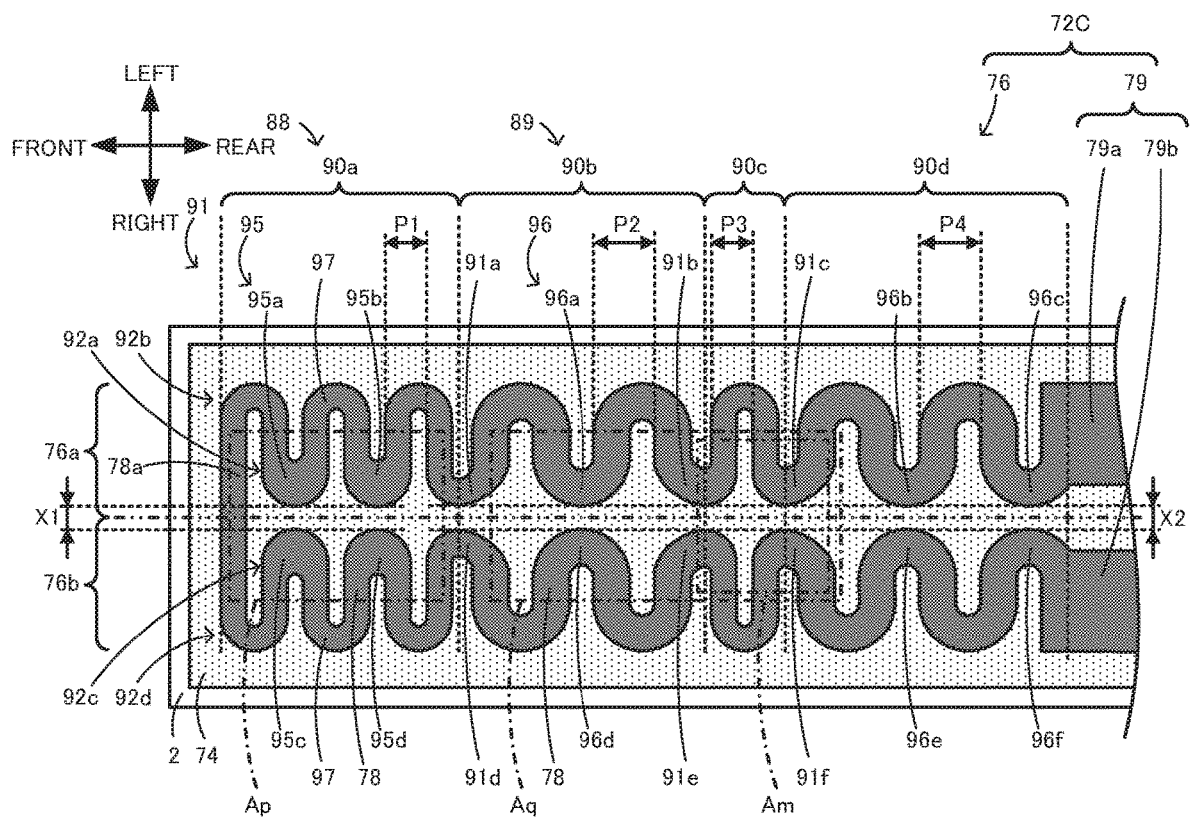
FIG. 5 is an explanatory view of a heater 72C in a modification.

In a heater having an aspect in which the length direction of the linear portions 78 is along the short-length direction of the heater portion 70, just like the heater 72B illustrated in FIG. 4, the pitch of the fold of the heater may be set to be sparse or dense. FIG. 5 is an explanatory view of a heater 72C in a modification. As illustrated in FIG. 5, the heating portion 76 of the heater 72C has a zigzag belt-like shape as drawn in one continuous stroke in which both ends are connected to the lead portions 79. The heating portion 76 includes plural bend portions 91 (32 bend portions in FIG. 5) and plural linear portions 78 (31 linear portions in FIG. 5). The bend portions 91 and the linear portions 78 are electrically connected in series. The heating portion 76 has a bilateral symmetry shape such that the central axis (two-dot chain line in FIG. 5) of the sensor element 101 in the left-right direction is a symmetry axis. A left portion of the heating portion 76 from the central axis is referred to as a left heating portion 76a, and a right portion symmetrical to the left heating portion 76a is referred to as a right heating portion 76b.

The left heating portion 76a and the right heating portion 76b each extend so as to be folded multiple times at the bend portions 91 such that a folding direction is along the left-right direction and so as to be folded in the front-rear direction as a whole. The left heating portion 76a and the right heating portion 76b are connected to each other by a frontmost linear portion 78a among the linear portions 78. Thus, the heating portion 76 extends so as to be folded toward the rear at the linear portion 78a (and a left outside bend portion 92b and a right outside bend portion 92d that are connected thereto) after extending from the rear to the front as a whole. That is, the heating portion 76 extends along the longitudinal direction (front-rear direction) so as to be folded once as a whole.

Each of the bend portions 91 is a folded portion whose folding direction is along the left-right direction (short-length direction). The bend portions 91 of the left heating portion 76a that are located on the inside (right hand side) of the sensor element 101 in the left-right direction are referred to as left inside bend portions 92a. The bend portions 91 of the left heating portion 76a that are located on the outside (left hand side) of the sensor element 101 in the left-right direction are referred to as the left outside bend portions 92b. Likewise, the bend portions 91 of the right heating portion 76b that are located on the inside (left hand side) and the outside (right hand side) of the sensor element 101 in the left-right direction are referred to as right inside bend portions 92c and the right outside bend portions 92d, respectively. The heating portion 76 includes eight of the left inside bend portions 92a, left outside bend portions 92b, right inside bend portions 92c, and right outside bend portions 92d. The left inside bend portions 92a and the right outside bend portions 92d are folded portions that are folded toward the left after extending from the left (one side in the short-length direction) to the right (the other side in the short-length direction). The left outside bend portions 92b and the right inside bend portions 92c are folded portions that are folded toward the right after extending from the right to the left. Each of the bend portions 91 is bent into a curved shape and has an arc shape of a semicircle. The bend portions 91 may have a bent shape like a broken line. The heating portion 76 is disposed such the each of the bend portions 91 and each of the linear portions 78 are alternately connected. That is, each of the bend portions 91 connects the linear portions 78 adjoining in the front-rear direction to each other. More specifically, the left inside bend portions 92a connect the right ends of the adjoining linear portions 78 of the left heating portion 76a to each other. The left outside bend portions 92b connect the left ends of the adjoining linear portions 78 of the left heating portion 76a to each other. Likewise, the right inside bend portions 92c and the right outside bend portions 92d connect the left ends and the right ends of the adjoining linear portions 78 of the right heating portion 76b to each other, respectively. The rearmost bend portion 91 (a second bend portion 96c described later) among the bend portions 91 of the left heating portion 76a is connected at the rear end thereof to the first lead 79a. The rearmost bend portion 91 (a second bend portion 96f described later) among the bend portions 91 of the right heating portion 76b is connected at the rear end thereof to the second lead 79b.

The linear portions 78 are arranged so as to be apart from each other along the longitudinal direction (front-rear direction) of the sensor element 101. The length direction of each of the linear portions 78 is along the short-length direction (left-right direction) of the sensor element 101. In the heater 72C in FIG. 5, the linear portions 78 are each disposed such that the length direction is parallel to the left-right direction. The length direction of the linear portions 78 is an axial direction of the linear portions 78, in other words, a direction in which electric current runs. The same is true in the case of the length direction of the bend portions 91.

In the heating portion 76, the pitch of the fold along the left-right direction is changed so as to be sparse or dense, and the heating portion 76 is divided into first to fourth regions 90a to 90d in order from the front to the rear depending on the difference in the pitch. The pitches of the fold along the left-right direction in the first to fourth regions 90a to 90d are respectively set to be pitches P1 to P4. The pitch of the fold represents a period of the fold and is the sum of the line width (the line width of the linear portions 78 in FIG. 5) of the heating portion 76 in the front-rear direction and the interval (distance) in the front-rear direction between portions (the linear portions 78 in FIG. 5) of the heating portion 76 that adjoin in the front-rear direction. In the heater 72C in FIG. 5, P1=P3<P2=P4 holds. The heating portion 76 thus includes a region 88 (the first and third regions 90a and 90c) whose pitch of the fold is dense and a region 89 (the second and fourth regions 90b and 90d) whose pitch of the fold is sparse, and these regions are disposed in the front-rear direction. The line width of the first region 90a and the line width of the third region 90c are identical, and the interval between the linear portions 78 of the first region 90a in the front-rear direction and the interval between the linear portions 78 of the third region 90c in the front-rear direction are identical. The line width of the third region 90c and the line width of the fourth region 90d are identical, and the interval between the linear portions 78 of the third region 90c in the front-rear direction and the interval between the linear portions 78 of the fourth region 90d in the front-rear direction are identical. The line width of the first to fourth regions 90a to 90d varies at their joints (at the front and rear of their boundaries) but is constant at the other portions in the same region. For example, bend portions 91a and 91d extending over the first region 90a and the second region 90b have a gradually increasing (thickening) line width while extending from the side of the first region 90a toward the side of the second region 90b. Bend portions 91b and 91e extending over the second region 90b and the third region 90c and bend portions 91c and 91f extending over the third region 90c and the fourth region 90d are also formed such that the line width gradually varies in the same manner.

Since the heating portion 76 thus includes at least one dense region 88 and at least one sparse region 89 that are arranged in the front-rear direction, a temperature distribution in the front-rear direction of the sensor element 101 when heat is generated is adjusted. In the heater 72C in FIG. 5, as the average temperature of the vicinity (portions located above and below the regions 90a to 90d among the layers 1 to 6) of each of the first to fourth regions 90a to 90d is compared along the front-rear direction, the temperature of the vicinity of the first region 90a is highest, and the temperature decreases in the order of the vicinity of the second region 90b, the third region 90c, and the fourth region 90d. The temperature of the vicinity of a region whose pitch of the fold is dense basically tends to be high. In the heater 72C in FIG. 5, however, the temperature of the vicinity of the third region 90c is slightly lower than the temperature of the vicinity of the second region 90b. The reason is that, for example, an area occupied by the third region 90c is smaller than an area occupied by the first region 90a (length in the front-rear direction is shorter), or the vicinity of the second region 90b is heated also by the first region 90a. The temperature (average temperature) of the first region 90a among the dense regions 88 is higher than the temperature (average temperature) of the third region 90c when the heating portion 76 generates heat, and the temperature (average temperature) of the first region 90a of the heating portion 76 is highest. For this reason, the first region 90a is referred to as a highest temperature region. Which region of the dense regions 88 (the first region 90a and the third region 90c) is the highest temperature region is determined on the basis of the average temperature of each region in a state in which the average temperature of the entire heating portion 76 is adjusted to range from 700° C. to 900° C.

The positional relationships of the dense regions 88 and the sparse regions 89 of the heating portion 76 with respect to the inner pump electrode 22, the auxiliary pump electrode 51, and the measurement electrode 44 are adjusted. This will be described. In FIG. 5, an inner-pump-electrode projection region Ap that is a region in which the inner pump electrode 22 is projected on the heating portion 76 in the thickness direction (here, downward) is illustrated by the frame of a one-dot chain line. Likewise, an inner auxiliary-pump-electrode projection region Aq and a measurement-electrode projection region Am in which the auxiliary pump electrode 51 and the measurement electrode 44 are respectively projected on the heating portion 76 are illustrated by the frames of one-dot chain lines. As illustrated in FIG. 1, there is the ceiling electrode portion 51a of the auxiliary pump electrode 51 just above the measurement electrode 44. Accordingly, the inner auxiliary-pump-electrode projection region Aq and the measurement-electrode projection region Am in FIG. 5 overlap. More specifically, the measurement-electrode projection region Am is included in the inner auxiliary pump electrode projection region Aq. As seen from FIG. 5, the first region 90a of the dense regions 88 is located so as to at least partially overlap the inner-pump-electrode projection region Ap. In other words, the first region 90a is disposed such that at least part of the first region 90a faces the inner pump electrode 22 in the vertical direction (is located just below the inner pump electrode 22). In FIG. 5, the inner-pump-electrode projection region Ap is located so as to be included in the first region 90a. The second region 90b of the sparse regions 89 is located so as to overlap the inner auxiliary pump electrode projection region Aq, and a portion of the inner auxiliary-pump-electrode projection region Aq that is nearer to the front than the measurement-electrode projection region Am is included in the second region 90b. The third region 90c of the dense regions 88 is located so as to at least partially overlap the measurement-electrode projection region Am. In the heater 72C in FIG. 5, the measurement-electrode projection region Am overlaps the third region 90c so as to protrude from the third region 90c in the front-rear directions.

Since the positional relationships of the dense regions 88 and the sparse regions 89 with respect to the inner pump electrode 22, the auxiliary pump electrode 51, and the measurement electrode 44 are thus adjusted, temperature distributions of the electrodes and the vicinity thereof is adjusted. As described above, when the heating portion 76 generates heat, the temperature of the vicinity of the first region 90a is highest, and the temperature decreases in the order of the vicinity of the second region 90b, the third region 90c, and the fourth region 90d. Accordingly, temperature Tp>temperature Tq>temperature Tm holds where the temperatures of the inner pump electrode 22, the auxiliary pump electrode 51, and the measurement electrode 44 are temperatures Tp, Tq, and Tm [° C.], respectively. Since the measurement-electrode projection region Am overlaps the third region 90c of the dense regions 88, although the temperature Tm is lower than the temperature Tq, the difference is small and the temperature Tm is prevented from being excessively low. The pitch of the fold of the dense regions 88 and the sparse regions 89 can be determined such that the temperatures Tp, Tq, and Tm when the heating portion 76 generates heat are desired values. The pitches P1 and P3 of the dense regions 88 range, for example, from 0.4 mm to 0.7 mm, and the pitches P2 and P4 of the sparse regions 89 range, for example, from 0.7 mm to 0.9 mm. However, this is not a limitation.

The heating portion 76 includes, as part of the bend portions 91, first bend portions 95, second bend portions 96, and third bend portions 97. The first bend portions 95 are the bend portions 91 (folded portions) that are located in the highest temperature region (first region 90a) and whose fold apexes face each other in the left-right direction. That is, the first bend portions 95 are four bend portions 91 of first bend portions 95a and 95c and first bend portions 95b and 95d that face each other in the first region 90a. The second bend portions 96 are the bend portions 91 (folded portions) that are located in the sparse regions 89 and whose fold apexes face each other in the left-right direction. That is, the second bend portions 96 are six bend portions 91 of second bend portions 96a and 96d that face each other in the second region 90b and second bend portions 96b and 96e and the second bend portions 96c and 96f that face each other in the fourth region 90d. The third bend portions 97 are the bend portions 91 (folded portions) that are located in the highest temperature region (first region 90a) and are located at positions away from the first bend portions 95 toward the outside in the short-length direction (left-right direction). That is, the third bend portions 97 are six bend portions 91 of three bend portions 91 located in the first region 90a among the left outside bend portions 92b and three bend portions 91 located in the first region 90a among the right outside bend portions 92d. The bend portions 91 extending over the dense regions 88 and the sparse regions 89 (overlapping the dense regions 88 and the sparse regions 89) are not included in the first bend portions 95 nor the second bend portions 96. That is, the bend portions 91a and 91d extending over the first and second regions 90a and 90b and the bend portions 91b and 91e extending over the second and third regions 90b and 90c, and the bend portions 91c and 91f extending over the third and fourth regions 90c and 90d are not included in the first bend portions 95 nor the second bend portions 96. With regard to the third bend portions 97, on the other hand, among the bend portions 91 extending over the highest temperature region (first region 90a) and other regions, the bend portions 91 located at positions away from the first bend portions 95 toward the outside in the short-length direction (left-right direction) are included in the third bend portions 97. In the heater 72C in FIG. 5, the distance X1 [mm] between the first bend portions 95 located in the highest temperature region (first region 90a) among the dense regions 88 is equal to the distance X2 [mm] between the second bend portions 96 located in the sparse regions 89. The heater 72C, however, is not limited to the case of X1=X2, but may satisfy X1>X2 or X1<X2. In the heater 72C in FIG. 5, the distance between the first bend portions 95a and 95c and the distance between the first bend portions 95b and 95d are the same value (=distance X1). Likewise, the distance between the second bend portions 96a and 96d, the distance between the second bend portions 96b and 96e, and the distance between the second bend portions 96c and 96f are the same value (=distance X2). However, in the case where the distance between the facing first bend portions 95 is not constant, for example, when the distance between the first bend portions 95a and 95c is different from the distance between the first bend portions 95b and 95d, the average value of the distance between the facing portions is determined to be the distance X1. The same is true in the case of the distance X2. In the heater 72C in FIG. 5, with regard to the bend portions 91a to 91f that are not included in the first bend portions 95 nor the second bend portions 96, the distance between the facing portions is determined to be equal to the distance X2(=distance X1). The distances X1 and X2 may be, for example, 0.2 mm or more and less than 1.0 mm.

In the heater 72C in this modification, the resistance value per unit length of the first bend portions 95 is changed in a manner in which the width Wa1 [mm] of the first bend portions 95 is caused to be larger than the width W2 of the linear portions 78. In the heater 72C in this modification, the unit resistance value Ra1 [μΩ/mm], which is the resistance value per unit length of the first bend portions 95, is lower than the unit resistance value R2 [μΩ/mm], which is the resistance value per unit length of the linear portions 78, at least at a temperature within a temperature range of no less than 700° C. and no more than 900° C. In other words, the unit resistance value ratio Ra1/R2 at least at a temperature within the above temperature range is less than 1. Thus, the heat density (calorific value per unit length) of the first bend portions 95 is lower than the heat density of the linear portions 78 at least at a temperature from 700° C. and 900° C. As the detail will be described later, when the unit resistance value Ra1 is thus lower than the unit resistance value R2 (that is, the unit resistance value ratio Ra1/R2 is less than 1), an increase in the temperature of the first bend portions 95, whose temperature is likely to be high among the highest temperature region (first region 90a), can be suppressed, and degradation of the first bend portions 95, which are particularly likely to be degraded among the bend portions 91, can be suppressed. In the heater 72C in FIG. 5, with regard to the bend portions 91 (including the third bend portions 97) other than the first bend portions 95, the sectional area (the thickness and the line width) is equal to the sectional area of the linear portions 78 in each region, and the same is true in the case of the resistance value per unit length. The unit resistance value R1 and the unit resistance value R2, however, are the average values of the resistance values per unit length of the bend portions 91 and the linear portions 78, respectively, as described in the embodiment. Accordingly, also in the heater 72C in FIG. 5, when the unit resistance value Ra1 of the first bend portions 95 is lower than the unit resistance value R2 of the linear portions 78, R1<R2 (the unit resistance value ratio R1/R2 is less than 1) holds.

The unit resistance value Ra1 is the average value of the resistance value per unit length of the first bend portions 95. Accordingly, even when part of the first bend portions 95 is a portion having a resistance value per unit length larger than the resistance value per unit length of the linear portions 78, it is only necessary for the resistance value per unit length of the first bend portions 95 as a whole to be lower than the resistance value per unit length of the linear portions 78. However, the resistance value per unit length is preferably lower than the unit resistance value R2 at any portion of the first bend portions 95. The unit resistance value ratio Ra1/R2 of the heating portion 76 is preferably less than 1 at any temperature within the above temperature range. The unit resistance value ratio Ra1/R2 of the heating portion 76 at least at a temperature within the above temperature range is preferably 0.87 or less, more preferably 0.80 or less. The unit resistance value ratio Ra1/R2 may be 0.5 or more at any temperature within the above temperature range. In the heater 72C in the FIG. 5, the sectional area Sa1 [mm$^2$] of the first bend portions 95 is caused to be larger than the sectional area S2 of the linear portions 78 (the sectional area ratio S2/Sa1 is less than 1) in a manner in which the width Wa1 of the first bend portions 95 of the belt-like heater 72C is caused to be larger (thicker) than the width W2 of the linear portions 78, and consequently, the unit resistance value ratio Ra1/R2 is caused to be less than 1. The sectional area Sa1 is a sectional area perpendicular to the length direction of each of the first bend portions 95. The unit resistance value ratio Ra1/R2 becomes less than 1 at any temperature within a temperature range from 700° C. to 900° C. in a manner in which the sectional area ratio S2/Sa1 is adjusted such that the unit resistance value ratio Ra1/R2 is less than 1. The sectional area ratio S2/Sa1 is preferably 0.87 or less, more preferably 0.80 or less. In the heater 72C in FIG. 5, the sectional area ratio S2/Sa1 is adjusted in a manner in which the width Wa1 is caused to be larger than the width W2. It is, however, only necessary for the sectional area ratio S2/Sa1 to be adjusted at least in a manner in which the width Wa1 is caused to be larger than the width W2, or the thickness Da1 of the first bend portions 95 is caused to be larger than the thickness D2 of the linear portions 78. The value of the sectional area Sa1 is the average value in the first bend portions 95 as in the unit resistance value Ra1. The sectional area of the first bend portions 95 is equal to the sectional area of the linear portions 78 (and the third bend portions 97) at portions at which the first bend portions 95 and the linear portions 78 are connected to each other, and the first bend portions 95 are formed such that the sectional area gradually increases (here, the width Wa1 increases) with increasing a distance from the linear portions 78. That is, the first bend portions 95 are each formed such that the sectional area of a section (section that traverses a portion protruding to the right the most, for example, in the first bend portions 95a and 95b) of a central portion in the front-rear direction becomes largest. The sectional area of the first bend portions 95 may be caused to be the same value (=sectional area Sa1) at any portion in a manner in which steps are produced at portions at which the first bend portions 95 and the linear portions 78 are connected to each other. The sectional area ratio S2/Sa1 may be 0.5 or more. The width Wa1 may be no less than 0.05 mm and no more than 1.5 mm. The thickness Da1 may be no less than 0.003 mm and no more than 0.1 mm.

In the gas sensor 100 including the heater 72C in the modification thus configured, since the pitch of the fold of the heating portion 76 is adjusted to be dense or sparse, the temperature of the above electrodes satisfies temperature Tp>temperature Tq>temperature Tm in use (when the heating portion 76 generates heat). The measurement-object gas before the concentration of oxygen is adjusted in the first interior space 20 by the main pump cell 21 flows to the vicinity of the inner pump electrode 22 from the side of the gas inlet 10, and accordingly, the concentration of oxygen at the vicinity of the inner pump electrode 22 is high. Accordingly, in order to pump a large amount of oxygen by the main pump cell 21, the solid electrolyte layers of the inner pump electrode 22 and the vicinity thereof are further activated in a manner in which the temperature Tp is caused to be higher than the temperatures Tq and Tm. In contrast, the concentration of oxygen at the vicinity of the auxiliary pump electrode 51 and the measurement electrode 44 is lower than the concentration of oxygen at the vicinity of the inner pump electrode 22. Accordingly, hydrogen or carbon monoxide may be produced due to, for example, reduction of water or carbon dioxide in the measurement-object gas, and these may chemically react with oxygen in NOx, resulting in a decrease in measurement accuracy. Reduction of components other than such a specific gas (NOx) is more likely to occur as the temperature increases. Accordingly, the decrease in measurement accuracy can be suppressed in a manner in which the temperatures Tq and Tm are caused to be lower than the temperature Tp.

Figure 6:
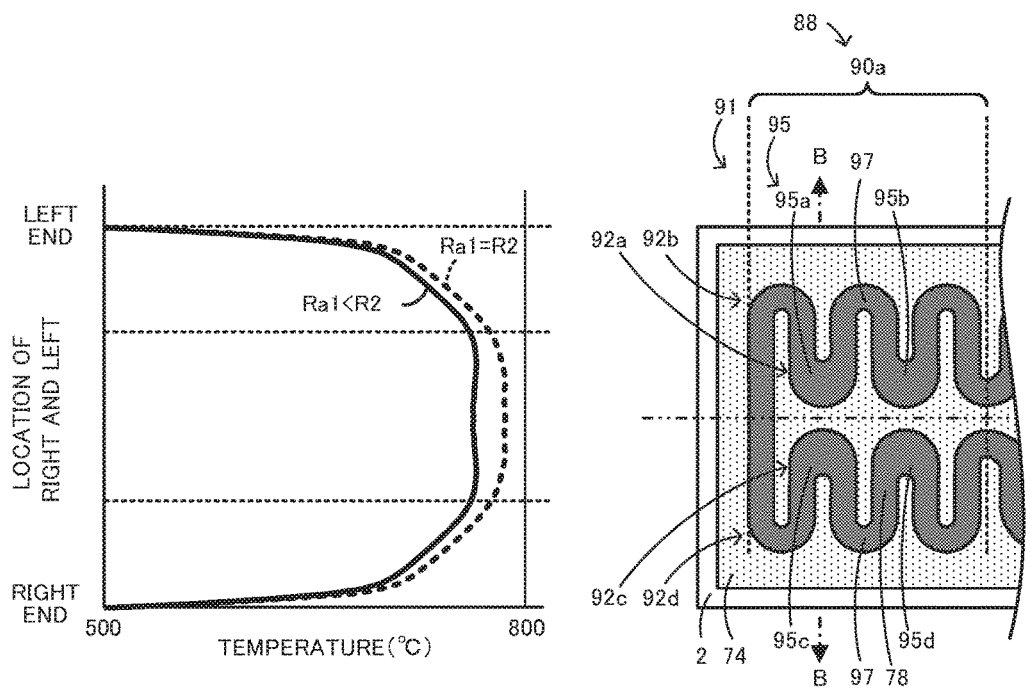
FIG. 6 is a schematic diagram of a temperature distribution in the left-right direction of the vicinity of the highest temperature region (first region 90a) of a heating portion 76.

Thus, in the heater portion 70 including the heater 72C in the modification, the dense regions 88 and the sparse regions 89 (first to fourth regions 90a to 90d) are disposed to achieve an intentional temperature distribution in the front-rear direction of the sensor element 101. In addition to this, there may be a temperature distribution in each region of the first to fourth regions 90a to 90d. For example, with regard to the temperature of the heating portion 76, the temperature of the left inside bend portions 92a and the right inside bend portions 92c is typically higher than the temperature of the left outside bend portions 92b and the right outside bend portions 92d. The reason is that heat is transferred between the left inside bend portions 92a and the right inside bend portions 92c that face each other, or the left inside bend portions 92a and the right inside bend portions 92c are located at positions away from the inside the left outside bend portions 92b and the right outside bend portions 92d toward the center of the sensor element 101 in the left-right direction. Accordingly, in particular, the temperature of the first bend portions 95 among the left inside bend portions 92a and the right inside bend portions 92c is typically likely to be high locally in the highest temperature region (first region 90a). That is, in particular, the temperature of the first bend portions 95 among the bend portions 91 is likely to be high, and the first bend portions 95 are likely to be degraded. The temperature of the linear portions 78, on the other hand, is less likely to be high compared with the first bend portions 95. In the heater 72C in the modification, the resistance value per unit length of the first bend portions 95 at least at a temperature within the above temperature range is lower than the resistance value per unit length of the linear portions 78 (the unit resistance value ratio Ra1/R2 is less than 1). Accordingly, localized heating in the highest temperature region (first region 90a) of the heater 72C can be further reduced. That is, an increase in the temperature of the first bend portions 95, which is likely to be high, can be further suppressed. This enables degradation of the first bend portions 95, which are particularly likely to be degraded among the bend portions 91, to be suppressed. The lifetime of the first bend portions 95 whose breakage, for example, is likely to occur due to its degradation is increased, and consequently, the lifetime of the entire heater 72C is increased. FIG. 6 is a schematic diagram of a temperature distribution in the left-right direction of the vicinity of the highest temperature region (first region 90a) of the heating portion 76. FIG. 6 illustrates, on the right hand side, the vicinity of the first region 90a in FIG. 5 and illustrates, on the left hand side, a graph of a temperature distribution of the upper surface of the third substrate layer 3 (see FIG. 1) taken along line B-B illustrated in FIG. 6 on the right hand side. As illustrated in the graph in FIG. 6, when the unit resistance value Ra1=unit resistance value R2 (thick broken line in the graph), the vicinity of the first bend portions 95, that is, a central portion of the sensor element 101 in the left-right direction is locally heated and its temperature is likely to be high. In the case where the unit resistance value Ra1 is lower than the unit resistance value R2 like the heater 72C in the modification (thick solid line in the graph), on the other hand, the temperature of the vicinity of the first bend portions 95 is decreased more than the temperature of the other portions, and localized heating is reduced.

Although the sectional area ratio S2/Sa1 is less than 1 in the heater 72C in FIG. 5, the unit resistance value ratio Ra1/R2 may be caused to be less than 1 in a manner in which the volume resistivity of the first bend portions 95 and the linear portions 78 is adjusted. For example, the volume resistivity ratio ρa1/ρ2 that is a ratio of the volume resistivity ρa1 [μΩ·cm] of the first bend portions 95 to the volume resistivity ρ2 of the linear portions 78 may be less than 1 at least at a temperature from 700° C. to 900° C. The unit resistance value ratio Ra1/R2 at least at a temperature within the above temperature range can be caused to be less than 1 also in this manner. The volume resistivity ratio ρa1/ρ2 is preferably 0.87 or less, more preferably 0.80 or less at least at a temperature within the above temperature range. The volume resistivity ρa1 and the volume resistivity ρ2 can be adjusted in the same manner as the volume resistivity ρ1 and the volume resistivity ρ2 are adjusted. The value of the volume resistivity ρa1 is the average value in the first bend portions 95 as in the unit resistance value Ra1. The volume resistivity ratio ρa1/ρ2 may be 0.5 or more at any temperature within the above temperature range.

In the heater 72C in FIG. 5, the width Wa1 of the first bend portions 95 is larger than the width Wa3 [mm] of the third bend portions 97. Thus, in the heater 72C, the unit resistance value ratio Ra1/Ra3 at least at a temperature from 700° C. to 900° C. is less than 1. A unit resistance value Ra3 [μΩ/mm] is the resistance value per unit length of the third bend portions 97. Degradation of the first bend portions 95 can be suppressed also in a manner in which the resistance value per unit length of the first bend portions 95 at least at a temperature within the above temperature range is thus caused to be lower than the resistance value per unit length of the third bend portions 97. As described above, the temperature of the first bend portions 95 is typically likely to be high locally in the highest temperature region (first region 90a), and the first bend portions 95 are likely to be degraded. The third bend portions 97, on the other hand, are located at positions away from the first bend portion toward the outside of the heater portion 70, and accordingly, the temperature of the third bend portions 97 is less likely to be high compared with the first bend portions 95. Accordingly, when the unit resistance value ratio Ra1/Ra3 is less than 1, localized heating in the highest temperature region (first region 90a) can be further reduced. That is, an increase in the temperature of the first bend portions 95, which is likely to be high, can be further suppressed. As in the case where the unit resistance value ratio Ra1/R2 is less than 1, this enables degradation of the first bend portions 95, which are particularly likely to be degraded among the bend portions 91, to be suppressed, and the lifetime of the entire heater 72C is increased. The unit resistance value Ra3 is the average value of the resistance value per unit length of the third bend portions 97. In the heater 72C in FIG. 5, at least at a temperature within the above temperature range, the unit resistance value ratio Ra1/R2 is less than 1 and the unit resistance value ratio Ra1/Ra3 is less than 1. However, when at least one of these is satisfied, the effect of suppressing degradation of the first bend portions 95 can be achieved. For example, in the case where the resistance value per unit length of the bend portions 91 is lower than the resistance value per unit length of the linear portions 78 in the same region of the first region 90a to the fourth region 90d in the same degree, there is a probability that the unit resistance value ratio Ra1/R2 is less than 1 and the unit resistance value ratio Ra1/Ra3 is 1 (unit resistance values of the first bend portions 95 and the third bend portions 97 are identical). Also in this case, the effect of suppressing degradation of the first bend portions 95 can be achieved compared with the case where the unit resistance value ratio Ra1/R2 is 1.

As in the case where the unit resistance value ratio Ra1/R2 is caused to be less than 1, in the case where the unit resistance value ratio Ra1/Ra3 is caused to be less than 1, for example, the sectional area Sa1 of the first bend portions 95 may be caused to be larger than the sectional area Sa3 [mm²] of the third bend portions 97 (the sectional area ratio Sa3/Sa1 is less than 1). In the case where the sectional area ratio Sa3/Sa1 is caused to be less than 1, at least one of the following manners may be adopted: the width Wa1 of the first bend portions 95 is caused to be larger than the width Wa3 of the third bend portions 97, or the thickness Da1 of the first bend portions 95 is caused to be larger than the thickness Da3 of the third bend portions 97. Alternatively, the unit resistance value ratio Ra1/Ra3 may be caused to be less than 1 in a manner in which the volume resistivity ratio ρa1/ρa3 that is a ratio of the volume resistivity ρa1 of the first bend portions 95 to the volume resistivity ρa3 [μΩ·cm] of the third bend portions 97 is caused to be less than 1 at least at a temperature within the above temperature range. The value of the sectional area Sa3 and the value of the volume resistivity ρa3 are the average values in the third bend portions 97 as in the unit resistance value Ra3. In the heater 72C in FIG. 5, the sectional area of the third bend portions 97 is the same value (=sectional area Sa3) at any portion.

Preferable aspects and values (numerical ranges) of the unit resistance value ratio Ra1/Ra3, the sectional area ratio Sa3/Sa1, and the volume resistivity ratio ρa1/ρa3 may be the same aspects and values (numerical ranges) as is described in the case where the unit resistance value ratio Ra1/R2 is less than 1. For example, even when part of the first bend portions 95 is a portion having a resistance value per unit length larger than the resistance value per unit length of the third bend portions 97, it is only necessary for the resistance value per unit length of the first bend portions 95 as a whole to be lower than the resistance value per unit length of the third bend portions 97. The resistance value per unit length is preferably lower than the unit resistance value Ra3 at any portion of the first bend portions 95. The unit resistance value ratio Ra1/Ra3 of the heating portion 76 is preferably less than 1 at any temperature within the above temperature range. The unit resistance value ratio Ra1/Ra3 of the heating portion 76 at least at a temperature within the above temperature range is preferably 0.87 or less, more preferably 0.80 or less. The unit resistance value ratio Ra1/Ra3 may be 0.5 or more at any temperature within the above temperature range. The same is true in the case of the sectional area ratio Sa3/Sa1 and the volume resistivity ratio ρa1/ρa3. The width Wa3 may be no less than 0.05 mm and no more than 1.5 mm. The thickness Da3 may be no less than 0.003 nm and no more than 0.1 mm.

As described above, in the heater 72C in FIG. 5, with regard to the bend portions 91 (including the third bend portions 97) other than the first bend portions 95, the sectional area (the thickness and the line width) is equal to the sectional area of the linear portions 78 in each region, and the same is true in the case of the resistance value per unit length. The resistance value per unit length of the bend portions 91 other than the first bend portions 95, however, is preferably lower than the unit resistance value R2 (for example, the bend portions 91 are thicker than the linear portions 78). Thus, degradation of the bend portions 91 other than the first bend portions 95 can also be suppressed. The resistance value per unit length of the bend portions 91 (including the third bend portions 97) other than the first bend portions 95 may be lower than the unit resistance value R2 (for example, the bend portions 91 are thicker than the linear portions 78) and the resistance value per unit length of the first bend portions 95 may be lower than the resistance value per unit length of the third bend portions 97 (for example, the first bend portions 95 are thicker than the third bend portions 97). Thus, while degradation of the bend portions 91 as a whole is suppressed, localized heating in the highest temperature region (first region 90a) is suppressed, and degradation of the first bend portions 95 can be further suppressed.

As in the case where the unit resistance value ratio R1/R2 is less than 1 in the embodiment, in the case where the unit resistance value ratio Ra1/R2 is less than 1 in the heater 72C in FIG. 5, there may be a combination of a sectional area ratio S2/Sa1 of less than 1 and a volume resistivity ratio ρa1/ρ2 of less than 1. Likewise, in the case where the unit resistance value ratio Ra1/Ra3 is less than 1 in the heater 72C in FIG. 5, there may be a combination of a sectional area ratio Sa3/Sa1 of less than 1 and a volume resistivity ratio ρa1/ρa3 of less than 1. As in the relationship between the unit resistance value Ra1 and the unit resistance value R2, the unit resistance value Ra1 may be lower than a unit resistance value Ra4 [μΩ/mm] that is the resistance value per unit length of the linear portions 78 (eight linear portions 78 in FIG. 5) that are located in the highest temperature region (first region 90a) and are proximate to the first bend portions 95. The linear portions 78 that are proximate to the first bend portions 95 mean the linear portions 78 that are directly connected to the first bend portions 95. The unit resistance value ratio Ra1/Ra4 may be less than 1 instead of causing the unit resistance value ratio Ra1/R2 to be less than 1, or the unit resistance value ratio Ra1/Ra4 may be less than 1 in addition to causing the unit resistance value ratio Ra1/R2 to be less than 1.

In the heater 72C in the modification in FIG. 5, the positional relationships of the dense regions 88 and sparse regions 89 of the heating portion 76 with respect to the inner pump electrode 22, the auxiliary pump electrode 51, and the measurement electrode 44 are adjusted as illustrated in FIG. 5, but this is not a particular limitation. The condition that temperature Tp>temperature Tq>temperature Tm holds is not a particular limitation. However, at least part of the highest temperature region (first region 90a) is preferably overlap the inner-pump-electrode projection region Ap.

The number of the bend portions 91 and the linear portions 78 may be increased or decreased compared with the pattern of the heater 72C illustrated in FIG. 5. In this case, the heating portion 76 only needs to include, as the bend portions 91, at least two or more first bend portions 95 (at least one pair of the facing first bend portions 95) and two or more second bend portions 96 (at least one pair of the facing second bend portions 96). In the case where the unit resistance value ratio Ra1/Ra3 is less than 1, the heating portion 76 only needs to include at least one third bend portion 97 and may include the plural third bend portions 97. The left heating portion 76a may not be symmetrical with the right heating portion 76b.

The arrangement of the dense regions 88 and the sparse regions 89 (first to fourth regions 90a to 90d) is also not limited to the heater 72C in FIG. 5. For example, regions other than the first region 90a may be the sparse regions 89, for example, such that the pitch P3 of the third region 90c is equal to the pitches P2 and P4. In the case where there is thus only one dense region 88, this region is the highest temperature region. Although the heating portion 76 includes two dense regions 88 and two sparse regions 89 in the heater 72C in FIG. 5, in the case where the pitch of the fold of the heater is set to be sparse or dense, the heating portion 76 only needs to include at least one dense region 88 and at least one sparse region 89. Although the line width of the dense regions 88 and the interval between the dense regions 88 in the front-rear direction are lower than those of the sparse regions 89 in the heater 72C in FIG. 5, it is only necessary for the pitch of the fold of the dense regions 88 to be denser (for the pitch to be smaller) than the pitch of the fold of the sparse regions 89. That is, it is only necessary that at least one of the line width of the dense regions 88 and the interval between the dense regions 88 in the front-rear direction is lower than those of the sparse regions 89.

Although the length direction of the linear portions 78 is parallel to the short-length direction (left-right direction) of the heater portion 70 in the heater 72C in FIG. 5, the length direction may not be parallel provided that the length direction is along the short-length direction. For example, the length direction of the linear portions 78 may be inclined with respect to the short-length direction (less than 45°, though).

EXAMPLES

Examples in which sensor elements were specifically manufactured will be described below. Experimental examples 2 to 9 and 11 to 18 correspond to examples of the present invention, and experimental examples 1 and 10 correspond to comparative examples. Experimental example 1A corresponds to a comparative example, and experimental example 2A corresponds to an example of the present invention. It is to be noted that the present invention is not limited to the following examples.

Experimental Example 1 to 9

According to the method of manufacturing the gas sensor 100 described in the embodiment, the sensor elements 101 illustrated in FIGS. 1 and 2 were manufactured for experimental examples 1 to 9. Experimental examples 1 to 9 have the same configuration except that the sectional area ratio S2/S1 was changed as illustrated in Table 1 below in a manner in which the width W1 of the bend portions 77 was changed. The size of each sensor element 101 was that the length in the front-rear direction was 67.5 mm, the width of the left-right direction was 4.25 mm, and the thickness in the vertical direction was 1.45 mm. The width W1 of the bend portions 77 and the width W2 of the linear portions 78 in experimental example 1 were 0.25 mm. The thickness D1 of the bend portions 77 and the thickness D2 of the linear portions 78 in experimental example 1 were 0.01 mm. When each sensor element 101 was manufactured, zirconia particles to which 4 mol % of a yttria stabilizer was added, an organic binder, and an organic solvent were mixed, and ceramic green sheets were formed by tape casting. A conductive paste for the heating portion 76 of the heater portion 70 was adjusted as follows. A preliminary liquid mixture was obtained by adding and preliminarily mixing 4 mass % of alumina particles, 96 mass % of Pt, and a predetermined amount of an acetone solvent. The conductive paste was obtained in a manner in which a liquid organic binder obtained by dissolving 20 mass % of polyvinyl butyral and 80 mass % of butyl carbitol was added to and mixed with the preliminary liquid mixture, and butyl carbitol was then appropriately added to adjust the viscosity. In experimental example 1, the same conductive paste was used for the bend portions 77 and the linear portions 78, and the volume resistivity ratio $\rho1/\rho2$ was 1 at any temperature from 700° C. to 900° C. The same was true in experimental examples 2 to 9.

Experimental Example 10 to 18

The sensor elements 101 in experimental examples 10 to 18 were manufactured in the same manner as experimental example 1 except that the volume resistivity ratio $\rho1/\rho2$ was changed as illustrated in Table 1 below. The volume resistivity ratio $\rho1/\rho2$ was changed in a manner in which the proportion of Pt contained in the bend portions 77 was changed. The widths W1 and W2 and the thicknesses D1 and D2 in experimental examples 10 to 18 were the same as in experimental example 1, and the sectional area ratio S2/S1 in experimental examples 10 to 18 was 1.00. In experimental example 10 and experimental example 1, the value of the sectional area ratio S2/S1 and the value of the volume resistivity ratio $\rho1/\rho2$ were identical.

Measurement of the volume resistivity $\rho1$ in experimental examples 10 to 18 was performed by using a test piece manufactured as follows. An insulating paste that was to be the heater insulating layer 74 was first printed on the ceramic green sheet that was to be the second substrate layer 2 after firing. A conductive paste for the bend portions 77 manufactured under the same conditions as experimental examples 10 to 18 was subsequently printed on the insulating paste into a rectangular cuboid shape. Firing was then performed under the same conditions as experimental examples 10 to 18 to form a heating portion into a rectangular cuboid shape, and the test piece in each of experimental examples 10 to 18 was obtained. A lead for measurement of a resistance value was attached to the heating portion in the rectangular cuboid shape, the test piece was heated to 700° C. to 900° C. in an electric furnace, and the resistance value of the heating portion was measured in this state. The volume resistivity $\rho1$ was calculated on the basis of the length and sectional area of the heating portion in the rectangular cuboid shape and the measured resistance value. Likewise, the volume resistivity $\rho2$ was calculated from the resistance value measured by using the test piece. The value of the volume resistivity ratio $\rho1/\rho2$ in experimental examples 10 to 18 was scarcely changed at a range from 700° C. to 900° C.

[Evaluation Test]

In experimental examples 1 to 18, the durability (lifetime) of the heating portion 76 was evaluated. Specifically, a voltage was applied to the lead portions 79 to energize the heater 72 such that the average value of the temperature of the heating portion 76 was a predetermined temperature. Whether breakage of the heating portion 76 occurred within 2000 hours in this state was determined. The case in which breakage did not occur for more than 2000 hours was regarded as "A (excellent, the practical level or more)", the case in which breakage occurred within 2000 hours after 1000 hours was regarded as "B (good, the practical level)", and the case in which breakage occurred within 1000 hours was regarded as "C (failure, less than the practical level)". In each case where the average temperature of the heating portion 76 was 700° C., 750° C., 800° C., 850° C., and 900° C., the durability of the heating portion 76 was evaluated. The temperature of the heating portion 76 was adjusted in a manner in which the voltage applied to the lead portions 79 was changed. The temperature of the heating portion 76 was indirectly measured in a manner in which the temperature of the lower surface of each sensor element 101 was measured with a radiation thermometer. The results of the evaluation test are illustrated in Table 1. In Table 1, values of the unit resistance value ratio R1/R2, the sectional area ratio S2/S1, and the volume resistivity ratio $\rho1/\rho2$ in each experimental example are also illustrated. The value of the unit resistance value ratio R1/R2 was calculated as the product of the sectional area ratio S2/S1 and the volume resistivity ratio $\rho1/\rho2$.

TABLE 1

| | Unit Resistance Value Ratio | Sectional Area Ratio | Volume Resistivity Ratio | Average Temperature of Heating Portion (° C.) | | | | |
|---|---|---|---|---|---|---|---|---|
| | R1/R2 | S2/S1 | $\rho1/\rho2$ | 700 | 750 | 800 | 850 | 900 |
| Experimental Example 1 | 1.00 | 1.00 | 1.00 | C | C | C | C | C |
| Experimental Example 2 | 0.95 | 0.95 | 1.00 | C | C | C | C | C |
| Experimental Example 3 | 0.91 | 0.91 | 1.00 | C | C | C | C | C |
| Experimental Example 4 | 0.87 | 0.87 | 1.00 | A | B | B | B | B |
| Experimental Example 5 | 0.83 | 0.83 | 1.00 | A | A | B | B | B |
| Experimental Example 6 | 0.80 | 0.80 | 1.00 | A | A | A | A | A |
| Experimental Example 7 | 0.77 | 0.77 | 1.00 | A | A | A | A | A |
| Experimental Example 8 | 0.74 | 0.74 | 1.00 | A | A | A | A | A |
| Experimental Example 9 | 0.71 | 0.71 | 1.00 | A | A | A | A | A |
| Experimental Example 10 | 1.00 | 1.00 | 1.00 | C | C | C | C | C |
| Experimental Example 11 | 0.95 | 1.00 | 0.95 | C | C | C | C | C |
| Experimental Example 12 | 0.91 | 1.00 | 0.91 | C | C | C | C | C |
| Experimental Example 13 | 0.87 | 1.00 | 0.87 | A | B | B | B | B |
| Experimental Example 14 | 0.83 | 1.00 | 0.83 | A | A | B | B | B |
| Experimental Example 15 | 0.80 | 1.00 | 0.80 | A | A | A | A | A |

TABLE 1-continued

|  | Unit Resistance Value Ratio R1/R2 | Sectional Area Ratio S2/S1 | Volume Resistivity Ratio ρ1/ρ2 | Average Temperature of Heating Portion (° C.) | | | | |
|---|---|---|---|---|---|---|---|---|
|  |  |  |  | 700 | 750 | 800 | 850 | 900 |
| Experimental Example 16 | 0.77 | 1.00 | 0.77 | A | A | A | A | A |
| Experimental Example 17 | 0.74 | 1.00 | 0.74 | A | A | A | A | A |
| Experimental Example 18 | 0.71 | 1.00 | 0.71 | A | A | A | A | A |

A: Excellent,
B: Good,
C: Failure

As illustrated in Table 1, there was a tendency that as the value of the unit resistance value ratio R1/R2 decreased, breakage of the heating portion 76 was less likely to occur. There was a tendency that as the value of the unit resistance value ratio R1/R2 decreased, breakage of the heating portion 76 was less likely to occur even at a higher temperature. In experimental examples 4 to 9 and 13 to 18 in which the unit resistance value ratio R1/R2 was 0.87 or less, the evaluation was A (excellent) or B (good) at any temperature from 700° C. to 900° C. In experimental examples 6 to 9 and 15 to 18 in which the unit resistance value ratio R1/R2 was 0.80 or less, the evaluation was A (excellent) at any temperature from 700° C. to 900° C. In the experimental examples in which the valuation was B (good) or C (failure), breakage of the bend portions 77 occurred. As seen from a comparison between experimental examples 1 to 9 and experimental examples 10 to 18, when the unit resistance value ratio R1/R2 is identical, the same result is obtained in the case where the sectional area ratio S2/S1 is changed and in the case where the volume resistivity ratio ρ1/ρ2 is changed. In the case where the sectional area ratio S2/S1 was changed in a manner in which the thickness D1 of the bend portions 77 was changed, the same result as experimental examples 1 to 9 was obtained.

Experimental Example 1A and 2A

According to the method of manufacturing the gas sensor 100 described in the embodiment, the sensor elements 101 each including the heater 72C illustrated in FIG. 5 were manufactured for experimental examples 1A and 2A. In the experimental example 1A, however, the width Wa1 of the first bend portions 95 was equal to the line width of the linear portions 78 and the third bend portions 97 in the first region 90a, and the same was true for the thickness. Thus, in the experimental example 1A, the unit resistance value ratio R1/R2 was 1.00, the unit resistance value ratio Ra1/R2 was 1.29, and the unit resistance value ratio Ra1/Ra3 was 1.00. In experimental example 1A, the line width of the dense regions 88 of the heating portion 76 was 0.26 mm, and the line width of the sparse regions 89 of the heating portion 76 was 0.41 mm (except for portions at which the dense regions 88 and the sparse regions 89 are connected to each other). The pitches P1 and P3 of the fold were 0.56 mm. The pitches P2 and P4 of the fold were 0.82 mm. Experimental example 2A was the same as experimental example 1A except that the width Wa1 of the first bend portions 95 was 0.46 mm and the line width of the first bend portions 95 was thick as illustrated in FIG. 5. Thus, in experimental example 2A, the unit resistance value ratio R1/R2 was 0.92, the unit resistance value ratio Ra1/R2 was 0.73, and the unit resistance value ratio Ra1/Ra3 was 0.57.

[Evaluation Test]

In experimental examples 1A and 2A, the temperature and durability (lifetime) of the heater 72C when heat was generated were evaluated. Specifically, a voltage of 12 W was applied to the lead portions 79 to energize the heater 72C. When three minutes or more had passed after the voltage was applied, a temperature distribution of the highest temperature region (first region 90a) in a state in which the temperature of each sensor element 101 was stabilized was measured. A temperature distribution of the first region 90a was indirectly measured in a manner in which the temperature of a rectangular region that was located on the lower surface of each sensor element 101 and right below the first region 90a was measured with a radiation thermometer. The highest temperature, the average temperature, the lowest temperature, and a difference between the highest temperature and the average temperature were calculated from the measured results. Whether breakage of the heating portion 76 occurred within 2000 hours in a state in which the voltage was applied to the heater 72C was determined to evaluate the durability. The case in which breakage did not occur for more than 2000 hours was regarded as "A (excellent, the practical level or more)", the case in which breakage occurred within 2000 hours after 1000 hours was regarded as "B (good, the practical level)", and the case in which breakage occurred within 1000 hours was regarded as "C (failure, less than the practical level)".

Table 2 summarizes the unit resistance value ratios R1/R2, Ra1/R2, and Ra1/Ra3, the temperature distribution of the first region 90a (the highest temperature, the average temperature, the lowest temperature, and the difference between the highest temperature and the average temperature), and the evaluation of the durability in experimental examples 1A and 2A.

TABLE 2

|  | Unit Resistance Value Ratio R1/R2 | Unit Resistance Value Ratio Ra1/R2 | Unit Resistance Value Ratio Ra1/Ra3 | Temperature Distribution of The Highest Temperature Region (First Region) [° C.] | | | | Evaluation of Durability |
|---|---|---|---|---|---|---|---|---|
|  |  |  |  | Highest | Average | Lowest | Difference Between Highest and Average |  |
| Experimental Example 1A | 1.00 | 1.29 | 1.00 | 804 | 747 | 636 | 57 | C |
| Experimental Example 2A | 0.92 | 0.73 | 0.57 | 790 | 748 | 637 | 42 | A |

TABLE 2-continued

| Unit Resistance Value Ratio R1/R2 | Unit Resistance Value Ratio Ra1/R2 | Unit Resistance Value Ratio Ra1/Ra3 | Temperature Distribution of The Highest Temperature Region (First Region) [° C.] | | | | Evaluation of Durability |
|---|---|---|---|---|---|---|---|
| | | | Highest | Average | Lowest | Difference Between Highest and Average | |

A: Excellent,
C: Failure

As illustrated in Table 2, in experimental example 2A in which the values of the unit resistance value ratios R1/R2, Ra1/R2, and Ra1/Ra3 were less than 1, the evaluation of the durability was A (excellent). In experimental example 1A in which these values were 1 or more, on the other hand, the evaluation of the durability was C (failure). It can be understood from this result that the lifetime of the entire heater 72C can be increased in a manner in which the unit resistance value Ra1 of the first bend portions 95 is decreased (and consequently, the unit resistance value ratios R1/R2, Ra1/R2, and Ra1/Ra3 are decreased). In experimental example 1A, breakage of the first bend portions 95 occurred. The highest temperature of the highest temperature region (first region 90a) in experimental example 2A was lower than the highest temperature of the highest temperature region in experimental example 1A, and the difference between the highest temperature and the average value in experimental example 2A was also lower than the difference in experimental example 1A. However, there was little difference in the lowest temperature of the highest temperature region between experimental examples 1A and 2A. That is, in experimental example 2A, localized heating of the first bend portions 95 among the highest temperature region was reduced. It can be understood from this result that in experimental example 2A, degradation of the first bend portions 95, which were particularly likely to be degraded, was suppressed, degradation of the first bend portions 95 was thereby suppressed, and the lifetime of the heater 72C was increased.

The present application claims priority from Japanese Patent Application No. 2015-164213 filed on Aug. 21, 2015, and Japanese Patent Application No. 2016-015632 filed on Jan. 29, 2016, the entire contents of which are incorporated herein by reference.

What is claimed is:

1. A ceramic heater including:
   a heating element including a plurality of linear portions and a plurality of bend portions, and
   a ceramic plate-like body surrounding the heating element, the plate-like body having a longitudinal direction and a short-length direction,
   the heating element extending so as to be folded multiple times such that a folding direction is along the short-length direction and including at least one first region whose pitch of the fold along the short-length direction is a first value and at least one second region whose pitch of the fold along the short-length direction is a second value, each of the at least one first region and the at least one second region being arranged in the longitudinal direction, the second value being greater than the first value,
   the plurality of bend portions including first bend portions that are folded portions located in a highest temperature region of the at least one first region that is heated to a highest temperature when the heating element generates heat and that have fold apexes facing each other in the short-length direction, and
   the first bend portions having a resistance value per unit length, at a temperature in a range of 700° C. to 900° C., that is lower than a resistance value per unit length of the linear portions in the at least one first region.

2. The ceramic heater according to claim 1,
   wherein a unit resistance value ratio Ra1/R2 of unit resistance Ra1 [μΩ/mm], being the resistance value per unit length of the first bend portions, to unit resistance R2 [μΩ/mm], being the resistance value per unit length of the linear portions in the at least one first region, is 0.87 or less at the temperature in the range of 700° C. to 900° C.

3. The ceramic heater according to claim 1,
   wherein a sectional area of the first bend portions that is perpendicular to a length direction is larger than a sectional area of the linear portions in the at least one first region that is perpendicular to the length direction.

4. The ceramic heater according to claim 3,
   wherein the heating element has a belt-like shape, and
   a thickness of the first bend portions is larger than or equal to a thickness of the linear portions in the at least one first region.

5. The ceramic heater according to claim 3,
   wherein a sectional area ratio S2/Sa1 of a sectional area S2 [mm²], being the sectional area of the linear portions in the at least one first region that is perpendicular to the length direction, to a sectional area Sa1 [mm²], being the sectional area of the first bend portions that is perpendicular to the length direction, is 0.87 or less.

6. The ceramic heater according to claim 1,
   wherein a volume resistivity of the first bend portions at the temperature in the range of 700° C. to 900° C. is lower than a volume resistivity of the linear portions in the at least one first region.

7. The ceramic heater according to claim 6,
   wherein a volume resistivity ratio ρa1/ρ2 of a volume resistivity ρa1 [μΩ·cm], being the volume resistivity of the first bend portions, to a volume resistivity ρ2 [μΩ·cm], being the volume resistivity of the linear portions in the at least one first region, is 0.87 or less at the temperature in the range of 700° C. to 900° C.

8. The ceramic heater according to claim 1, wherein the plurality of linear portions includes four or more linear portions.

9. A sensor element including the ceramic heater according to claim 1,
   wherein a concentration of a specific gas in a measurement-object gas is detected.

10. A gas sensor including the sensor element according to claim 9.

11. A ceramic heater including:
    a heating element including a plurality of linear portions and a plurality of bend portions, and a ceramic plate-like body surrounding the heating element, the plate-like body having a longitudinal direction and a short-length direction, the heating element extending so as to be folded multiple times such that a folding direction is along the short-length direction and including at least one first region whose pitch of the fold along the short-length direction is a first value and at least one second region whose pitch of the fold along the short-length direction is a second value, each of the at least one first region and the at least one second region being arranged in the longitudinal direction, the second value being greater than the first value, the plurality of bend portions including first bend portions that are folded portions located in a highest temperature region of the at least one first region that is heated to a highest temperature when the heating element generates heat, the first bend portions having fold apexes facing each other in the short-length direction, and a third bend portion that is located in the highest temperature region and is located at a position away from the first bend portions toward an exterior of the ceramic heater in the short-length direction, and the first bend portions having a resistance value per unit length, at a temperature in a range of 700° C. to 900° C., that is lower than a resistance value per unit length of the third bend portion.

12. The ceramic heater according to claim 11,
wherein a unit resistance value ratio Ra1/Ra3 of unit resistance Ra1 [μΩ/mm], being the resistance value per unit length of the first bend portions, to unit resistance Ra3 [μΩ/mm], being the resistance value per unit length of the third bend portion, is 0.87 or less at the temperature in the range of 700° C. to 900° C.

13. The ceramic heater according to claim 11,
wherein a sectional area of the first bend portions that is perpendicular to a length direction is larger than a sectional area of the third bend portion that is perpendicular to the length direction.

14. The ceramic heater according to claim 13,
wherein the heating element has a belt-like shape, and a thickness of the first bend portions is larger than or equal to a thickness of the third bend portion.

15. The ceramic heater according to claim 13,
wherein a sectional area ratio Sa3/Sa1 of a sectional area Sa3 [mm$^2$], being the sectional area of the third bend portion that is perpendicular to the length direction, to a sectional area Sa1 [mm$^2$], being the sectional area of the first bend portions that is perpendicular to the length direction, is 0.87 or less.

16. The ceramic heater according to claim 11,
wherein a volume resistivity of the first bend portions at the temperature in the range of 700° C. to 900° C. is lower than a volume resistivity of the third bend portion.

17. The ceramic heater according to claim 16,
wherein a volume resistivity ratio ρa1/ρa3 of a volume resistivity ρa1 [μΩ·cm], being the volume resistivity of the first bend portions, to a volume resistivity ρa3 [μΩ·cm], being the volume resistivity of the third bend portion, is 0.87 or less at the temperature in the range of 700° C. to 900° C.

18. The ceramic heater according to claim 11, wherein the plurality of linear portions includes four or more linear portions.

19. A sensor element including the ceramic heater according to claim 11,
wherein a concentration of a specific gas in a measurement-object gas is detected.

20. A gas sensor including the sensor element according to claim 19.

* * * * *